US006373997B1

(12) United States Patent
Wayner et al.

(10) Patent No.: US 6,373,997 B1
(45) Date of Patent: Apr. 16, 2002

(54) COARSE AND FINE SKEW MEASUREMENT

(75) Inventors: Peter C. Wayner; Daniel P. Huttenlocher; Michael J. Hopcroft, all of Ithaca, NY (US); Todd A. Cass, Cambridge, MA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/043,135

(22) Filed: Mar. 29, 1993

Related U.S. Application Data

(63) Continuation of application No. 07/737,863, filed on Jul. 30, 1991, now abandoned.

(51) Int. Cl.[7] ............................................. G06K 9/36
(52) U.S. Cl. ..................................................... 382/289
(58) Field of Search ........................... 382/46, 18, 192, 382/199, 296, 289, 290, 291, 292, 286, 288

(56) References Cited

U.S. PATENT DOCUMENTS

| 2,838,602 A | 6/1958 | Sprick | 178/15 |
|---|---|---|---|
| 2,983,822 A | 5/1961 | Brouillette, Jr. | 250/202 |
| 3,297,989 A | 1/1967 | Atchley et al. | 340/146.3 |

(List continued on next page.)

FOREIGN PATENT DOCUMENTS

| EP | 431962 A2 | 6/1991 | G06K/9/32 |
|---|---|---|---|
| EP | 434415 A2 | 6/1991 | G06K/15/70 |

OTHER PUBLICATIONS

Baird, H.S., "The Skew Angle of Printed Documents," in SPSE Symposium on Hybrid Imaging Systems, May 20–21, 1987, Rochester, N.Y., pp. 21–24.

Postl, W., "Detection of Linear Oblique Structures and Skew Scan in Digitized Documents," Eighth International Conference on Pattern Recognition, Paris, France, Oct. 27–31, 1986, Proceedings, IEEE Computer Society Press, Washington, D.C., 1986, pp. 687–689.

Brickman, N.F., Rosenbaum, W.S., "World Autocorrelation Redundancy Match (WARM) Technology," IBM J Res Develop, vol. 26, No. 6, Nov. 1982, pp. 681–686.

Sato, J., Kuwamura, Y., Ohno, C., "F6365 Japanese Document Reader," Fujitsu Sci. Tech. J., 26, 3, pp. 224–233 (Oct. 1990).

*Primary Examiner*—Bhavesh Mehta

(57) ABSTRACT

A processor measures skew of lines in an image by obtaining a first, coarse approximation to skew direction and then using the first approximation to obtain a second, fine approximation that is more precise than the first. A third, even more precise approximation can be obtained using the second approximation, and further successive approximations can be similarly obtained. In an image of text, the first approximation can be obtained by finding the direction in which characters are closest together, since intercharacter distances are typically smaller than interline distances. This direction can be determined by measuring distances from selected pixels at edges of connected components across white pixels to edges of other connected components. The measured distances in each direction can be combined to obtain a central value for the direction, such as an average. The central values form a profile indicating central value as a function of direction. The minima separated by 180° within the profile indicate the direction of intercharacter spacing, which provides a first approximation of the skew direction. Alternatively, the first approximation can be obtained by finding a direction that has the largest variance in black pixels per line, because the lines in the direction of skew either have many black pixels due to characters in a line or few black pixels due to spaces between lines. The second approximation can then be obtained by determining which one of a number of directions close to the first approximation has the largest variance in black pixels per line. The range of directions used to obtain the second approximation can be based on the angle separating directions used in obtaining the first approximation.

19 Claims, 22 Drawing Sheets

U.S. PATENT DOCUMENTS

| | | | |
|---|---|---|---|
| 3,831,146 A | 8/1974 | Rundle | 340/146.3 |
| 4,052,699 A | 10/1977 | Micka et al. | 340/146.3 |
| 4,338,588 A | 7/1982 | Chevillat et al. | 340/146.3 |
| 4,499,499 A | 2/1985 | Brickman et al. | 358/263 |
| 4,533,959 A | 8/1985 | Sakurai | 358/280 |
| 4,558,461 A | 12/1985 | Schlang | 382/9 |
| 4,633,507 A | 12/1986 | Cannistra et al. | 382/61 |
| 4,723,297 A | 2/1988 | Postl | 382/46 |
| 4,748,676 A | 5/1988 | Miyagawa et al. | 382/46 |
| 4,759,075 A | 7/1988 | Lipkie et al. | 382/46 |
| 4,802,230 A | 1/1989 | Horowitz | 382/22 |
| 4,809,344 A | 2/1989 | Peppers et al. | 382/32 |
| 4,876,730 A | 10/1989 | Britt | 382/37 |
| 4,878,124 A | 10/1989 | Tsujimoto et al. | 358/443 |
| 4,926,490 A | 5/1990 | Mano | 382/9 |
| 4,953,230 A | 8/1990 | Kurose | 382/46 |
| 5,001,766 A | 3/1991 | Baird | 382/46 |
| 5,054,094 A | 10/1991 | Barski | 382/18 |
| 5,181,260 A | 1/1993 | Kurosu et al. | 382/46 |
| 5,187,753 A | 2/1993 | Bloomberg et al. | 382/46 |
| 5,191,438 A * | 3/1993 | Katsurada et al. | 382/46 |
| 5,245,674 A | 9/1993 | Cass et al. | 382/16 |
| 5,245,676 A | 9/1993 | Spitz | 382/46 |
| 5,253,307 A | 10/1993 | Wayner et al. | 382/22 |
| 5,276,742 A | 1/1994 | Dasari et al. | 382/46 |

* cited by examiner

COARSE AND FINE SKEW MEASUREMENT

This is a continuation of application Ser. No. 07/737,863, filed Jul. 30, 1991, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to analysis of an image that includes features with a prominent skew or orientation. More specifically, the invention relates to the measurement of an angle of skew of lines in an image, including lines of text.

Peppers et al., U.S. Pat. No. 4,809,344, describe techniques for preprocessing of character recognition. As shown and described in relation to FIGS. 2, 4, and 5A, masks are used to detect laterally and vertically written documents. Masks could be used that have slits inclined at any angle to discriminate an inclined character string or line of characters. As shown and described in relation to FIGS. 6–8, photosensor arrays have different alignment directions and are operated simultaneously to detect laterally and vertically written documents. Photosensor arrays can also be inclined, as shown and described in relation to FIG. 10, to obtain inclination angle data. Col. 6 lines 39–42 indicate that coarse scanning data may be obtained by the scanner of FIG. 2 such that fine scanning data is obtained by the scanner of FIG. 6.

SUMMARY OF THE INVENTION

The present invention provides automatic techniques that measure skew direction of lines in an image by obtaining a first approximation, then using data indicating the result of the first approximation to obtain a second approximation more precise than the first. In an image of text, the first approximation can be obtained by finding the direction in which characters are closest together, since intercharacter distances are typically smaller than interline distances. Alternatively, it can be obtained by determining which of a number of directions has the largest variance in black pixels per line, because the lines in the direction of skew either have many black pixels due to characters in a line or few black pixels due to spaces between lines. The second approximation can then be obtained by determining which one of a number of directions close to the first approximation has the largest variance in black pixels per line. Similarly, a third, even more precise approximation can be obtained by determining which of a number of directions close to the second approximation has the largest variance in black pixels per line. More generally, this technique can be extended to obtain a sequence of successive approximations of skew direction, each approximation more precise than the previous one.

One aspect of the invention is based on the observation of problems with conventional skew measurement techniques. Some skew measurement techniques are simple but imprecise, providing an angle that is accurate to within several degrees of the actual skew angle. Other skew measurement techniques are more precise, but computationally expensive. In addition, some of the more precise skew techniques are subject to a 90° error resulting from text configurations in which a white space extends in a direction perpendicular to the lines of text, such as between columns of text.

This aspect is based on the discovery of a skew measurement technique that alleviates these problems by making both a coarse or imprecise skew measurement and a fine or more precise skew measurement. The result of the coarse measurement is used as a starting point for the fine measurement. Because it can start within a few degrees of the actual skew angle based on the coarse measurement, the fine measurement may require less computation and is not subject to the 90° error described above. This technique can be repeated on the fine measurement to obtain an even more precise skew measurement. In general, this technique can obtain a sequence of successive approximations of skew direction, each approximation more precise than the previous one.

The coarse measurement can be implemented by finding an approximate skew of lines in an image. In an image that includes text, for example, distances between characters can be measured in each of a number of initial directions. If the connected components within the characters include pixels of a first color, such as black, and the background is of a second color, such as white, then these distances can be measured between edge pixels, which can be pixels of either color that have at least one neighbor of the other color. Specifically, distance could be measured starting from a black edge pixel and extending in each direction to the nearest black pixel.

Measured distance data indicating distances measured in each direction can then be combined, such as by averaging, to obtain central distance data indicating a central value of distances in each direction, and this data can be used to form a profile indicating central value of distance as a function of direction. The minima separated by 180° within the profile indicate the direction of intercharacter spacing within the lines of text, because characters are closer together along a line of text than between lines—in general, the intercharacter distances are smaller than the interline distances. Data indicating the direction of one of these minima can be provided as the first approximation of skew direction.

The coarse measurement can alternatively be implemented by measuring variance of pixels in a number of initial directions. For example, for a pivot pixel of the first color, i.e. the color of pixels within connected components, the coarse measurement can obtain the square of the number of first color pixels lying along a line extending through the pivot pixel in each of the initial directions. The results for a number of such pivot pixels can then be combined to obtain a sum of squares for each direction. The initial direction with the largest sum of squares provides a first approximation of the skew direction of the text lines because the variance in the number of black pixels is larger at the skew direction than at other directions. In text, for example, lines in the skew direction will either pass through the center of a line of text, with many black pixels, or through a region between lines of text, with only a few black pixels from ascenders and descenders, resulting in a large variance. Data indicating the initial direction with the largest sum of squares can be provided as the first approximation.

The fine measurement can be implemented using the approximate skew direction from the coarse measurement and a number of nearby directions. The nearby directions can cover a range that is a small integer multiple of the angle separating the initial directions. For example, for a pivot pixel of the first color, the fine measurement can obtain the square of the number of first color pixels lying along a line extending through the pivot pixel in each of the nearby directions. The results for a number of such pivot pixels can then be combined to obtain a sum of squares for each nearby direction, and the nearby direction with the largest sum of squares provides a second approximation of the skew direction of the text lines. Data indicating the nearby direction with the largest sum of squares can be provided as the second approximation.

An even more precise measurement could be implemented using the second approximation and a number of directions near it.

A machine implementing the invention can include image input means for receiving an input image and providing input image data and image output means for receiving output image data and providing an output image. A processor can store the input image data in memory, modify it in accordance with the skew direction, and then provide output image data to the output means based on the modified image data. For example, the output image could be a deskewed version of the input image. This technique could be applied in a facsimile machine or another digital copier.

The following description, the drawings, and the claims further set forth these and other objects, features, and advantages of the invention.

DETAILED DESCRIPTION

A. Conceptual Framework

Figure 1:
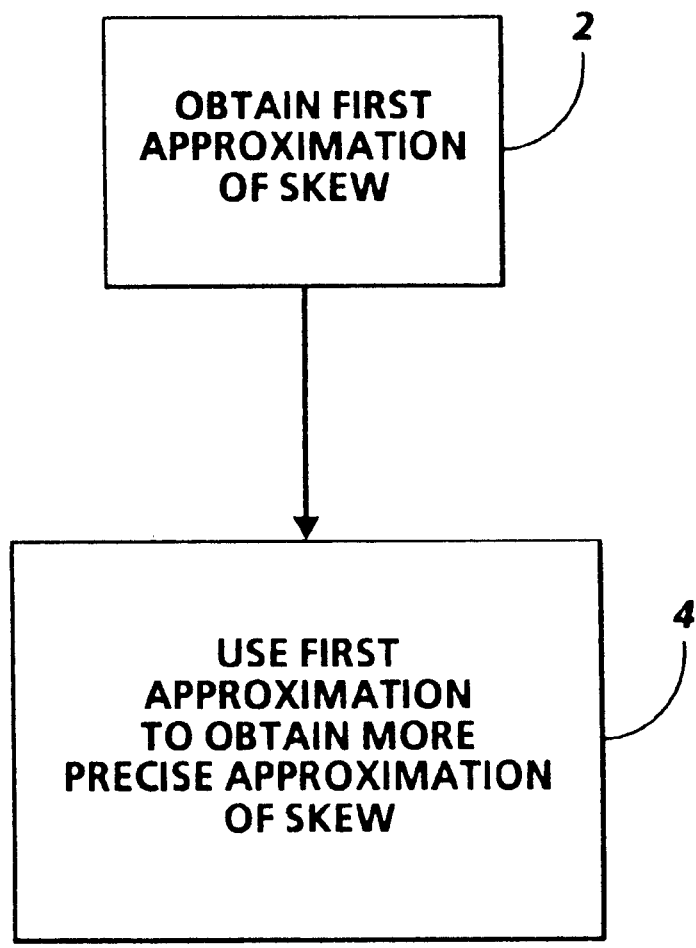
FIG. 1 is a flow chart showing general steps in measuring skew according to the invention.

The following conceptual framework is helpful in understanding the broad scope of the invention, and the terms defined below have the meanings indicated throughout this application, including the claims.

"Data" refers herein to signals that indicate information. When an item of data can indicate one of a number of possible alternatives, the item of data has one of a number of "values." For example, a binary item of data has one of two values, such as "0" and "1" or "ON" and "OFF."

"Data" includes data existing in any physical form, and includes data that is transitory or is being stored or transmitted. For example, data could exist as an electromagnetic or other transmitted signal or as a signal stored in electronic, magnetic, or other form.

A "data processing system" is a system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

Any two components are "connected" when there is a combination of circuitry that can transfer data from one of the components to the other. For example, two processing units are "connected" by any combination of connections between them that permits transfer of data from one of the processing units to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data.

Data "indicates" an attribute when the data has a value that depends on the existence of the attribute or on a measure of the attribute.

Data indicates an "approximation" of an attribute when it has a value that is an approximate measure of the attribute. A first approximation of an attribute is "more precise" than a second approximation if the first approximation has a smaller possible error.

Data indicates a "central value" of an attribute when it has a value that depends on a number of measurements of the attribute and indicates the center of the distribution of measurements. For example, data can indicate a central value of distances or of measurements of another scalar quantity by indicating a mean, mode, median, or other measure of central value.

Data indicates a "variance" of an attribute when it has a value that depends on a number of measurements of the attribute and indicates the degree to which the measurements vary. For example, data can indicate a standard deviation, a sum of squares, or other measure of variance.

Data indicates a "distribution" of an attribute when it has a value that depends on a number of measurements of the attribute. For example, data can indicate a distribution of distances or of measurements of another scalar quantity by indicating a measure of central value; a measure of variance; or a measure combining central value and variance such as the values at which the frequency is a specified number of decibels below the frequency of the mode.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An item of data is produced by "combining" other items of data when logical or numerical operations are performed on the other items of data that yield an item of data of the same time. For example, numbers indicating distance can be combined by adding, by calculating the mean or average, by selecting one of the distances, by taking the square root of the sum of squares, or by another similar operation.

Data is produced "randomly or pseudorandomly" when it is produced by a technique that provides data indicating numbers that, over a sufficiently large group of numbers, are evenly distributed across a range. A "random number" is a number that is produced randomly or pseudorandomly. Unless the context requires otherwise, the word "random" includes both random and pseudorandom.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "text" is an arrangement of one or more lines of characters; the characters of a text may form words. The "skew" or "skew direction" of lines of characters in a text or other lines in an image means the direction in which the lines extend, typically measured as an angle from a reference direction such as horizontal.

An "array of data" or "data array" or "array" is a combination of items of data that can be mapped into an array. A "two-dimensional array" is a data array whose items of data can be mapped into an array having two dimensions.

Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of light. An image may include characters, words, and text as well as other items such as graphics. A text may be included in a set of one or more images, such as in images of the pages of a document.

An image may be divided into "segments," each of which is itself an image. A segment of an image may be of any size up to and including the whole image.

Data "defines" an image when the data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

Data is produced by "applying a criterion" to other data when the produced data indicates whether the other data meets the criterion. An operation that applies a criterion produces such data.

A criterion can be "applied" to a location in an image by applying the criterion to data defining the image in a manner that depends on the location. For example, if the image data includes a respective data item for each location, the criterion could depend on a value indicated by a location's data item or it could depend on the values indicated by the respective data items of a set of locations having a relationship to the location. A location "meets a criterion" if application of the criterion to the location produces data indicating that the location meets the criterion.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the neighboring criterion used.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

A set of pixels in an image is "connected" if each pixel has at least one neighboring pixel that is in the set and if each pair of pixels in the set are connected by a subset of other pixels in the set. A connected set of pixels bounded by an edge may be called a "connected component" or "blob," and these terms may also be applied to more than one connected sets of pixels that are grouped for image analysis. In an image of text, connected components "form" text when the edges of the connected components generally follow the outlines of the parts of the text; if a text includes strokes, characters, or lines of characters, for example, connected components forming the text would have edges that generally follow the outlines of the strokes, characters, or lines of characters. Instances may occur in which a character includes more than one connected component and in which a connected component includes parts of two or more characters.

An "image characteristic" or "characteristic" is a measurable attribute of an image. An operation can "measure" a characteristic by producing data indicating the characteristic using data defining an image.

A characteristic is measured "for an image" if the characteristic is measured in a manner that is likely to produce approximately the same result each time it occurs.

A "profile" is data defining a characteristic as a function of a variable. For example, a profile may include data indicating a value of the characteristic for each of a number of directions. If the characteristic is a central value of distances, the profile may include an average or other measure of central value of the distances at each of the directions.

A "version" of a first image is a second image produced using data defining the first image. The second image may be identical to the first image, or it may be modified by loss of resolution, by changing the data defining the first image, or by other processes that result in a modified version.

An "image input device" is a device that can receive an image and provide a signal defining a version of the image. A "scanner" is an image input device that receives an image by a scanning operation, such as by scanning a document.

An "image output device" is a device that can receive a signal defining an image and provide the image as output. A "display" is an image output device that provides the output image in human viewable form.

B. General Features

Figure 2:
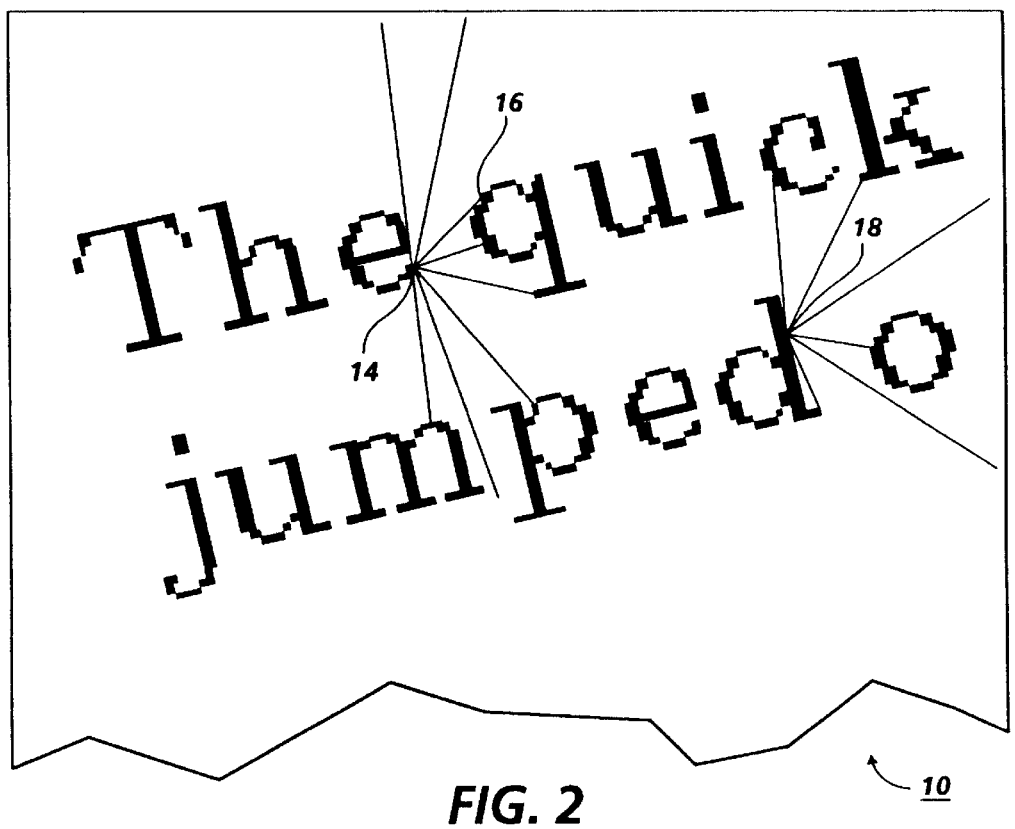
FIG. 2 is a schematic view of a part of an image that includes text, illustrating how distance can be measured in a number of directions.
Figure 3:
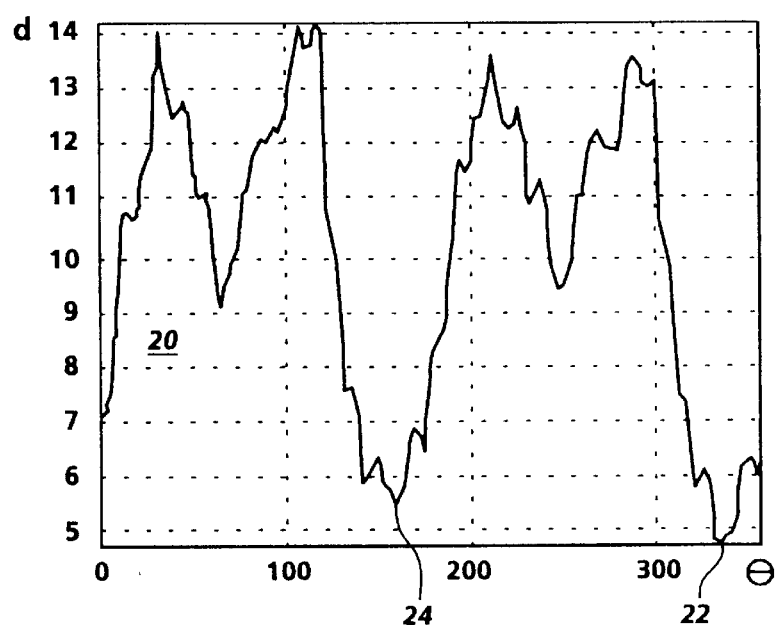
FIG. 3 is a graph showing distance as a function of direction, from which skew can be approximated.
Figure 4:
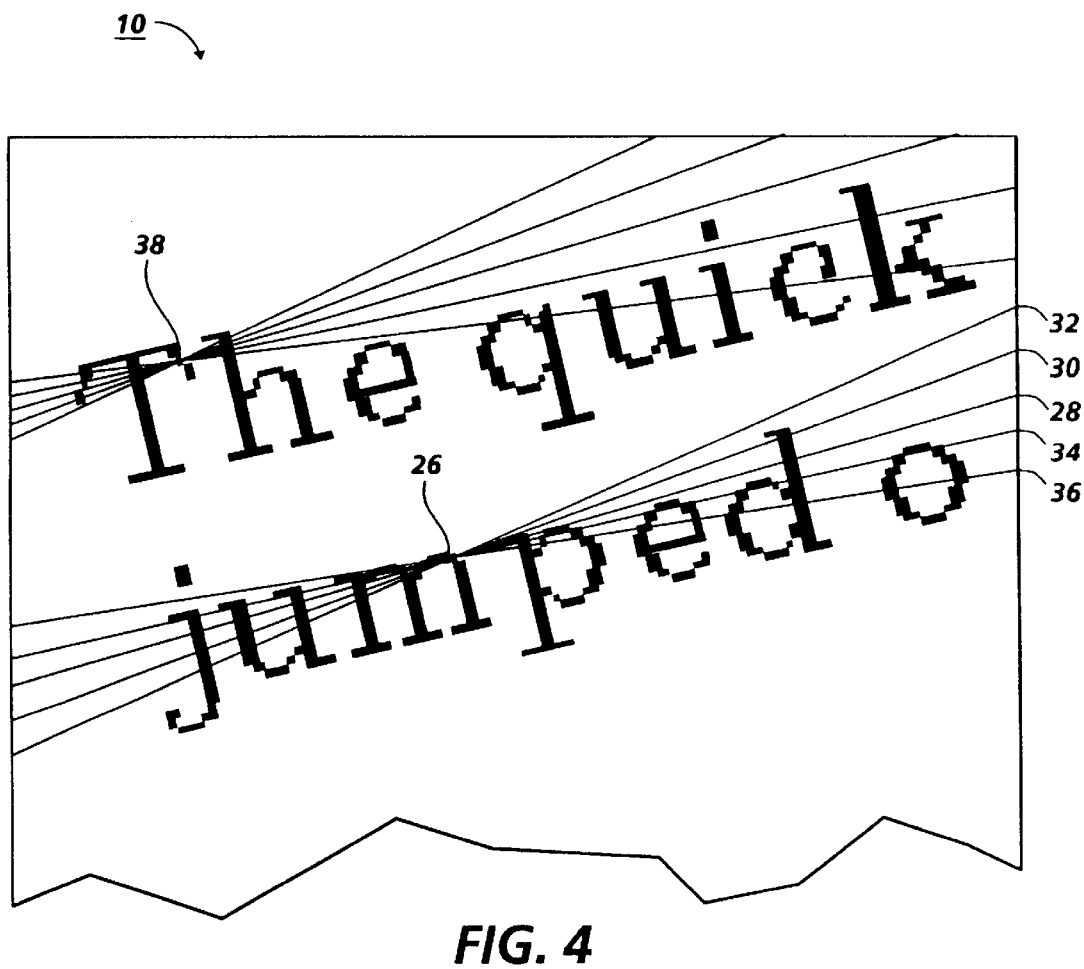
FIG. 4 is a schematic view of a part of an image that includes text, illustrating how the the number of black pixels along lines in different directions can be counted.
Figure 5:
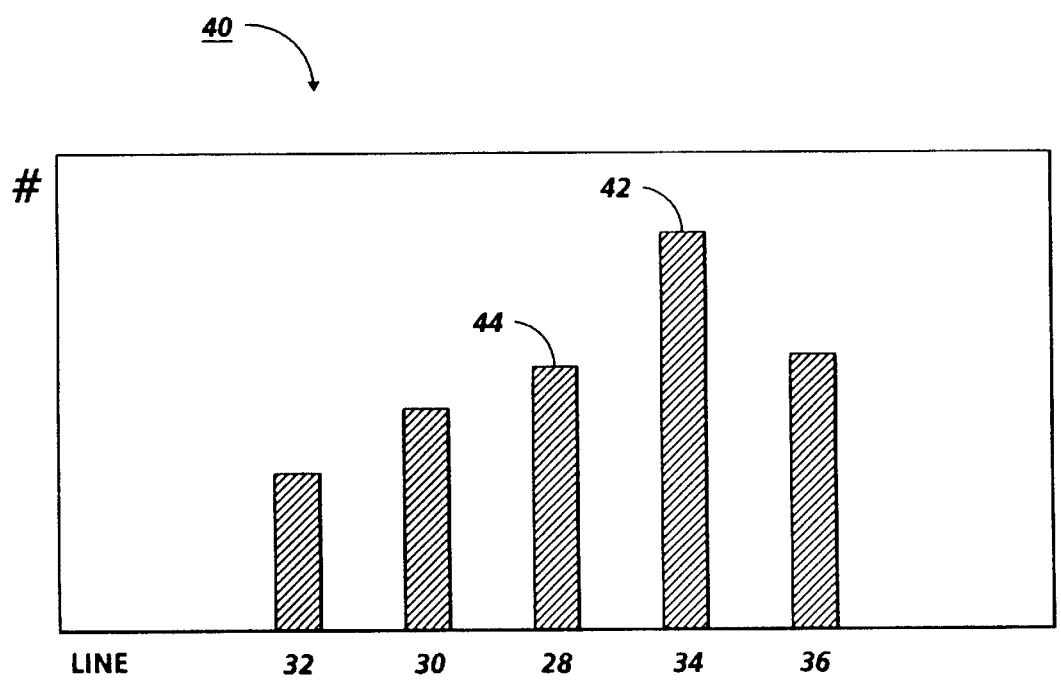
FIG. 5 is a graph showing a histogram of variance of counts as a function of direction, from which skew can be more precisely approximated.

FIGS. 1–5 illustrate general features of the invention. FIG. 1 is a flowchart showing general steps in obtaining first and second approximations of skew. FIG. 2 shows an image with distance measurements between connected components to obtain an approximation of skew. FIG. 3 shows a profile based on the measurements of FIG. 2 from which skew can be approximated. FIG. 4 shows an image with measurements to obtain a more precise approximation of skew. FIG. 5 shows a table based on the measurements of FIG. 4 from which skew can be more precisely approximated.

The step in box 2 in FIG. 1 obtains first skew data indicating a first approximation of skew direction of lines in an image. The step in box 4 then uses the first skew data to obtain second skew data indicating a more precise second approximation of skew direction.

FIG. 2 shows image 10 which includes lines of text at a skew. Measurements are taken from location 14 in a number of directions to other locations which meet a criterion, such as location 16. FIG. 2 illustrates a distance measuring technique in which the starting location is an edge, and the criterion for the stopping location is that it is black. These measurements may be taken according to the techniques described in copending, coassigned U.S. patent application Ser. No. 07/737,957, now issued as U.S. Pat. No. 5,245,674 entitled "Image Processing Using Distance as a Function of Direction," incorporated herein by reference. The angles between directions of measurement can have equal values, $\theta_i = (360°)/n$, where n is the number of directions that are measured. Other sets of measurements may be measured from other locations, such as location 18.

FIG. 3 shows a profile generated as shown in FIG. 2. The profile of distances from an edge pixel across white pixels to the nearest edge pixel in each of a large number of directions is highly informative about skew. Measurements made at several locations in the image can be combined to produce profile 20. When measurements at each direction are combined to produce a combined profile for image 10, minima occur at two directions separated by 180 degrees, which are directions approximately parallel to the lines of text. First minimum 22 indicates a first approximation of skew of the image. Second minimum 24 indicates the same skew direction, and is therefore approximately 180° from first minimum 22.

FIG. 4 shows image 10 in which a technique to find a more precise approximation of skew is performed using the result from FIG. 3. An appropriate range which covers the area around the first approximation of skew is determined. Measurements are then taken in a number of directions in this limited range, along lines which intersect starting or pivot location 26. The angles between directions can have equal values, $\theta_i = (\text{range})/n$, where n is the number of directions that are measured. Since the range is more limited than in FIG. 2, where the range was 360°, the directions can be much closer together if n is large enough.

In FIG. 4, line 28 extends in the approximate skew direction previously determined. Lines 32 and 36 extend in directions at the outer edges of the range. Inside the range, lines 30 and 34 extend in intermediate directions within the range. Along each line, each location which meets a criterion, such as being black, is counted to obtain a line value count for that line's direction. This operation may be performed for several additional pivot locations in the image, such as location 38. The line value counts for each direction may be combined to obtain a variance of the counts in each direction within the range.

FIG. 5 shows table 40 indicating the variance of line value counts of black pixels for directions as shown in FIG. 4. The variance in the counts of black pixels in each direction within a range that includes the actual skew direction is also highly informative about skew in an image. Lines in directions parallel to lines of text either have many black pixels if they pass through a text line, or a few black pixels if they pass mostly through space between text lines intersecting only ascending and descending portions of characters. But directions which are not parallel pass through text lines and through space between text lines and therefore have intermediate line value counts. The line value counts may be squared, and the squared values for each direction summed to obtain a sum-of-squares value for each direction. The sum-of-squares value approximates variance, and will be the greatest for the direction in which the line value counts have the greatest variance. The directions in which the line value counts contain intermediate values will have a smaller sum-of-squares value.

In FIG. 5, the value of bar 42 indicates a sum-of-squares for lines in the direction of line 34 in FIG. 4. The value of bar 44 indicates a sum-of-squares for the direction of the first approximate skew line 28 in FIG. 4. Bar 42 is the largest in the table, indicating that the direction of line 34 is a more precise approximation of the actual skew of the image than the direction of line 28 because the line value counts in that direction have the greatest variance.

The steps illustrated in FIGS. 4 and 5 may be repeated, using the more precise approximation of skew, with a new range determined by the approximate error in the previous calculations. For example, in the next operation the range could be bounded by lines 28 and 36 shown in FIG. 4, around the approximate skew line 34. Each time the steps are completed, the approximate skew direction obtained will be more precise.

Figure 6:
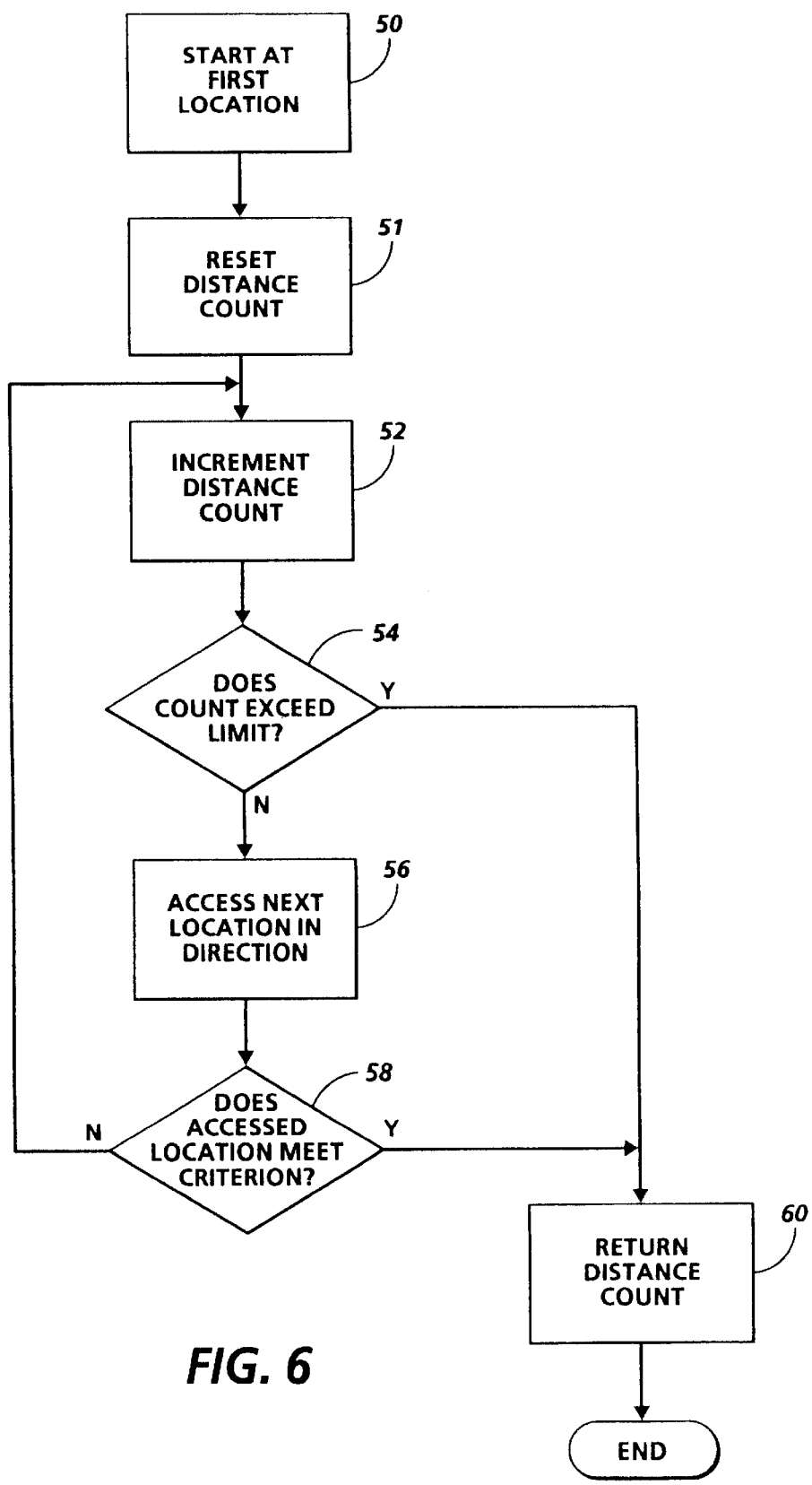
FIG. 6 is a flow chart showing steps in measuring distance from a starting location to an ending location.
Figure 7:
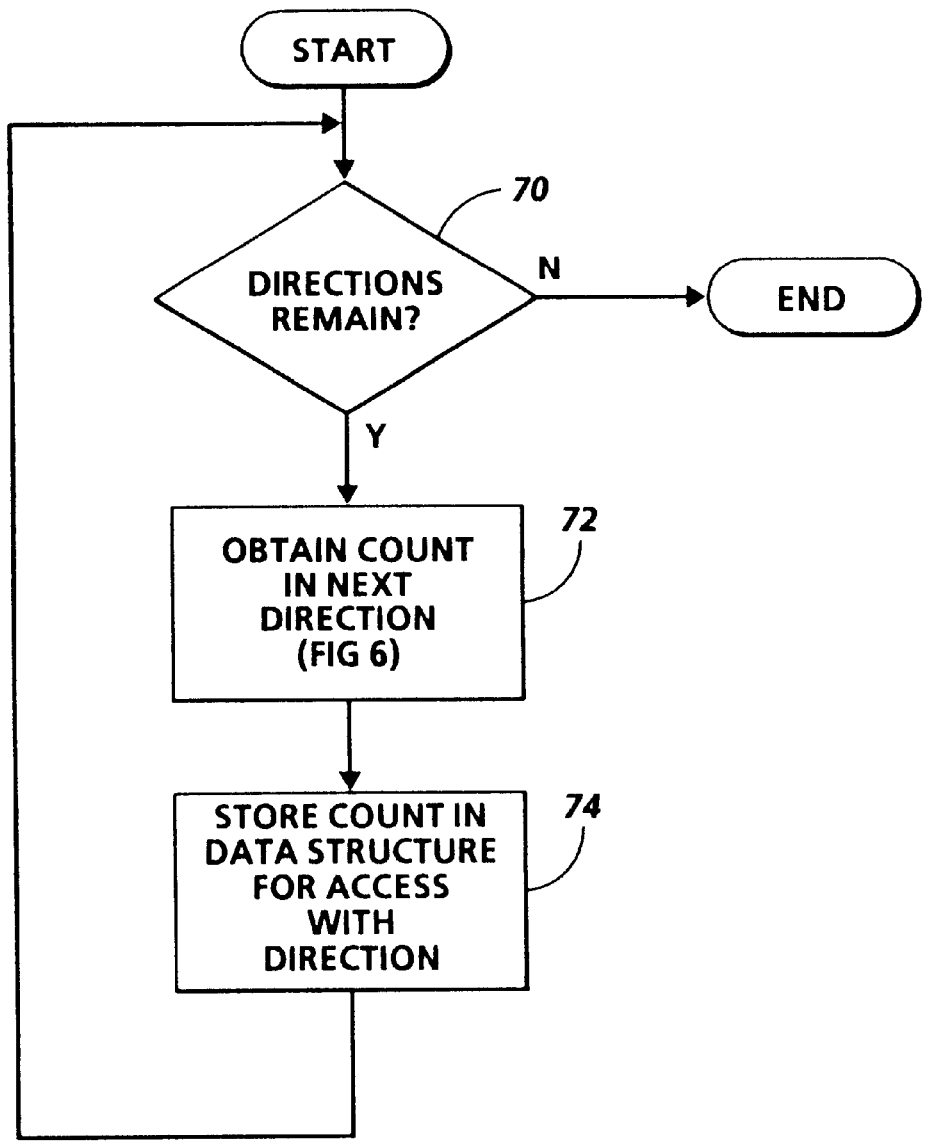
FIG. 7 is a flow chart showing steps in storing distance data obtained as in FIG. 6.
Figure 8:
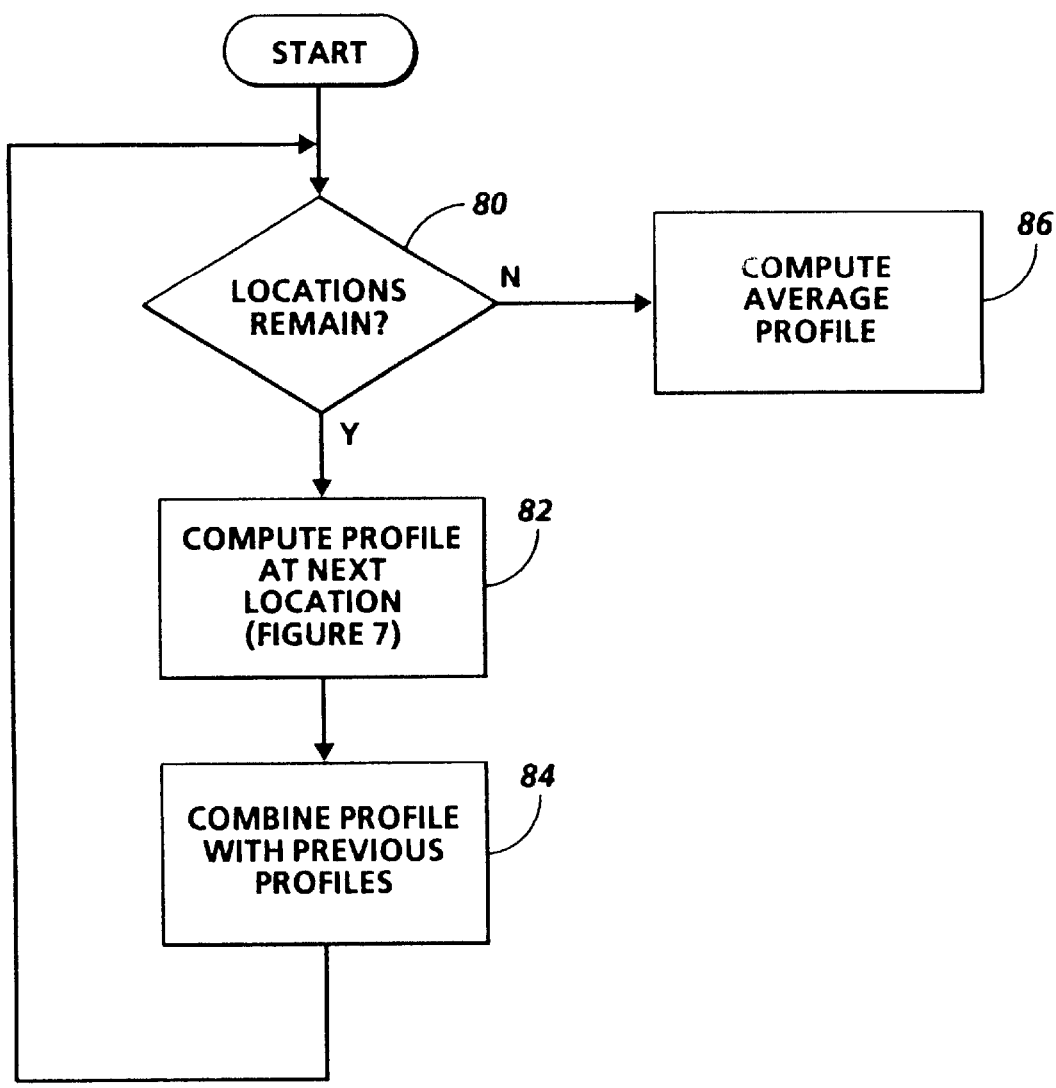
FIG. 8 is a flow chart showing steps in obtaining a profile for an image using distance data stored as in FIG. 7.

The flowcharts of FIGS. 6, 7, and 8 show a method that can be used to obtain a profile like that shown in FIG. 3. The flowchart of FIG. 6 shows steps in measuring distance from a starting location to an ending location. The flowchart of FIG. 7 shows steps in storing the distance data from FIG. 6 in a data structure. The flowchart of FIG. 8 shows steps in computing an average profile for an image from the distance data of FIG. 7.

FIG. 6 shows steps in obtaining data indicating the distance along a line in a direction from a first location to the nearest location along the line meeting a criterion. The step in box 50 starts at the first location. The step in box 51 resets a distance count. The step in box 52 increments the distance count. The test in box 54 determines whether the distance count exceeds a limit. The distance limit could be based on the height and width of the image, or on an arbitrary length after which no important data is likely to be found. If the distance limit is not exceeded, the step in box 56 accesses data defining the next location along the line. The step in box 58 then tests whether the accessed location meets the criterion.

If the accessed location does not meet the criterion, another iteration begins with the step in box 52. Iterations continue until a location is found that meets the criterion in box 58, or the distance count exceeds the distance limit in box 54. For example, if the criterion is a black pixel, the step of box 58 would test whether the next location is a black pixel, and iterations would continue until a black pixel is found or the distance limit is exceeded. At that point, the step in box 60 returns the distance count, which indicates either the distance to the nearest black pixel or the distance limit.

FIG. 7 shows general steps in storing distance data for a starting location in a data structure. The step in box 70 begins an iterative loop that handles each of a number of directions. At each iteration, the step in box 72 obtains a distance count in the next direction, following the steps in FIG. 6. Then the step in box 74 stores the distance count in a data structure in memory so that the count for each direction can be accessed with the direction for which it was obtained. When distances in all directions have been measured, the data structure for the location is complete, and may then be either used or stored.

FIG. 8 shows steps in combining profiles for a plurality of selected locations in an image to obtain a profile of distance as a function of direction for the image that includes the locations. These locations can be randomly selected as described in copending, coassigned U.S. patent application Ser. No. 07/737,956, entitled "Image Analysis based on Location Sampling," incorporated herein by reference.

The step in box 80 begins an iterative loop that handles each of a number of locations. The profile is obtained for the next location in the step in box 82, such as by following the steps in FIG. 7 to produce a profile data structure. The step of box 84 combines the profile with previous profiles, such as by adding the distance data in each direction. Alternatively, if profiles have been obtained and combined for all locations, the average profile of distance could be obtained in the step in box 86 by dividing the sum of distances in each direction by the number of locations.

The steps in boxes 84 and 86 can be allocated differently. For example, the profile of all the locations could be obtained and stored, omitting step 84 entirely, and then the step in box 86 could compute the average profile from the individual profiles. Also, the combined profile that results from the last iteration of box 84 could be used directly, without averaging, so that the step in box 86 is optional. The choice of how to implement these steps can depend on efficiency or other practical considerations.

Figure 9:
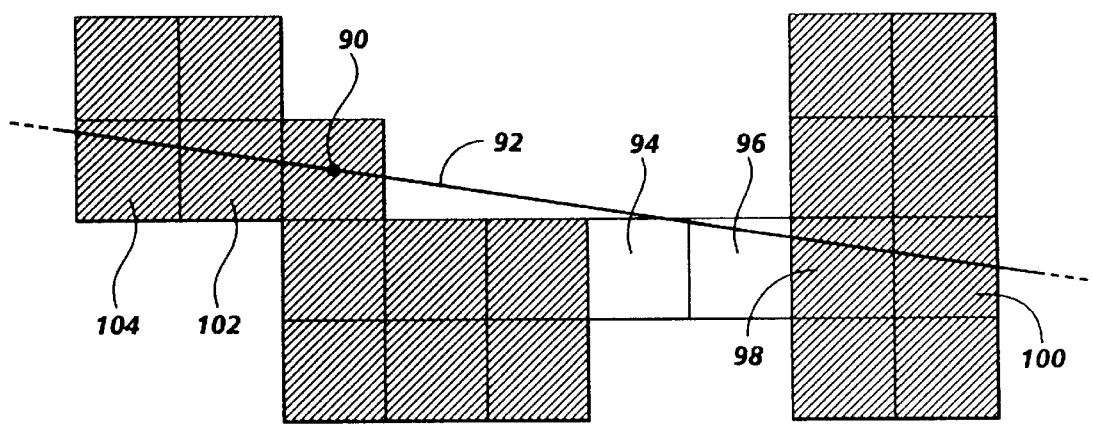
FIG. 9 is a schematic drawing of part of an image illustrating how pixels along a line can be counted.
Figure 10:
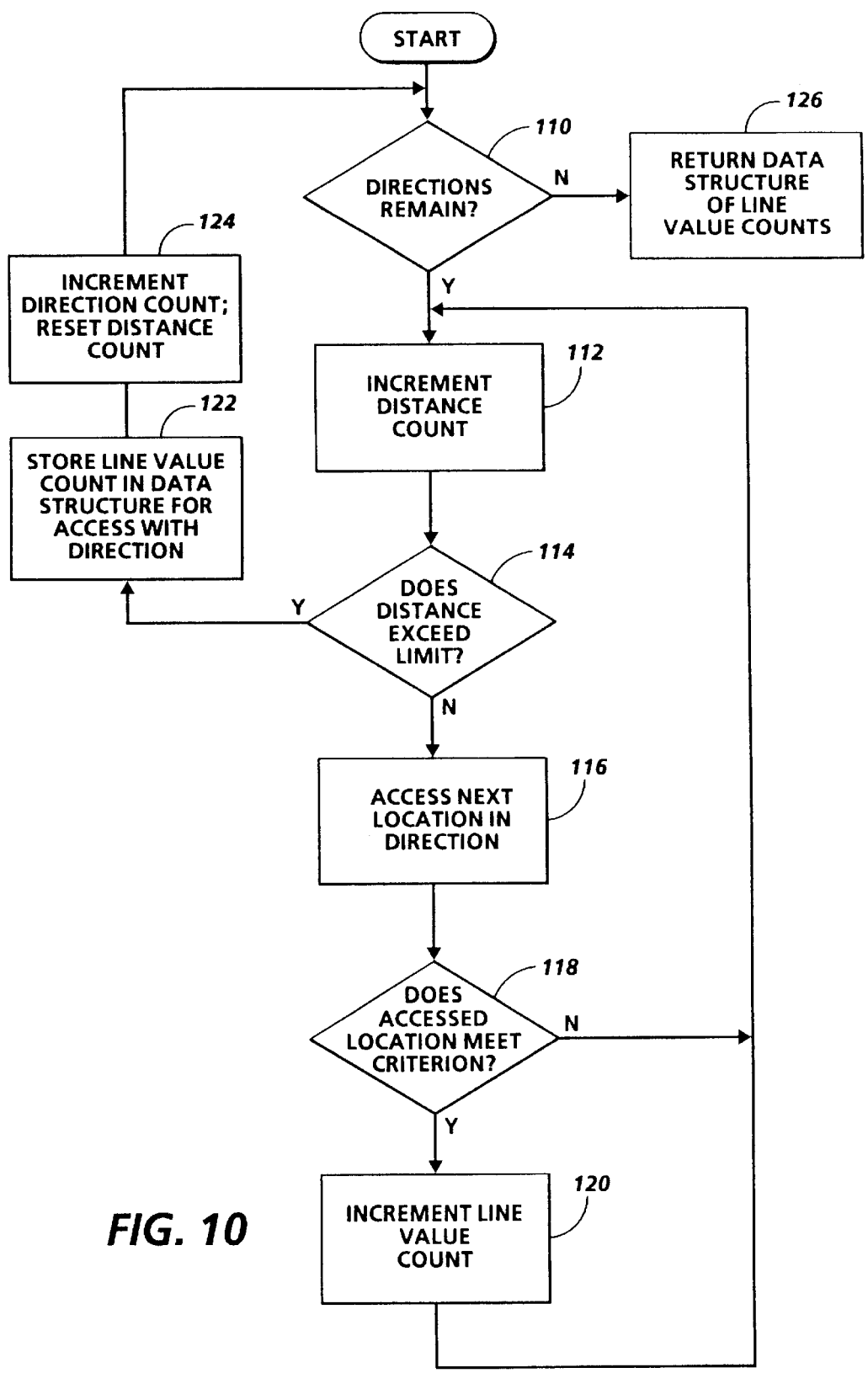
FIG. 10 is a flow chart showing steps in obtaining and storing counts of pixels for each of a number of directions.
Figure 11:
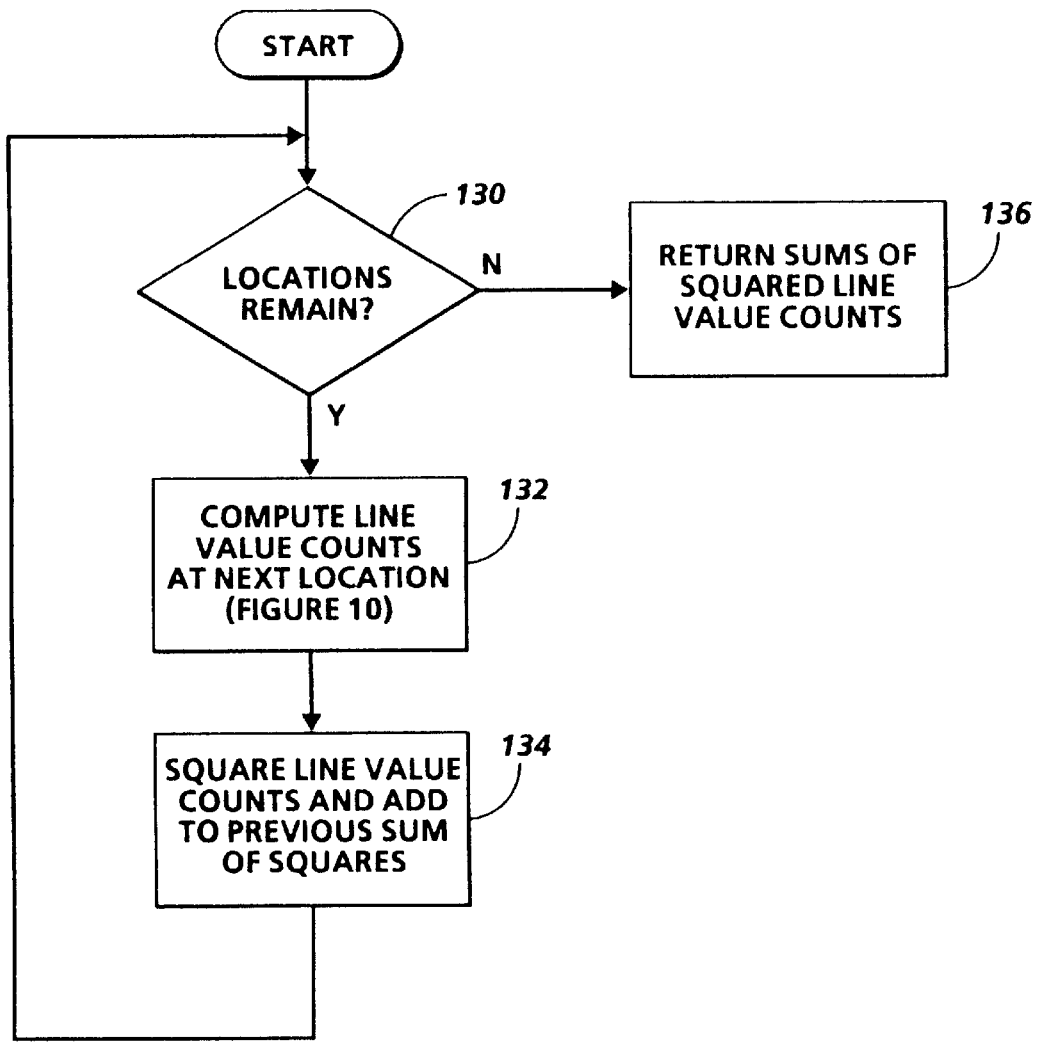
FIG. 11 is a flow chart showing steps in obtaining data indicating variance using count data obtained as in FIG. 10.

The flowcharts of FIGS. 9, 10, and 11 show a method of counting pixels along lines to obtain variances of line value counts as shown in FIG. 5.

FIG. 9 illustrates a method for counting pixels along a line to obtain a line value count. In FIG. 9 measurements are made from edge pixel 90 along line 92. Each pixel crossed by line 92 is checked to determine it meets a criterion, in this case whether it is black. When pixel 98 is found to meet the criterion, the line value count of line 92 is incremented. The same occurs when pixels 100, 102, and 104 are found to meet the criterion. Line 92 also crosses pixels 94 and 96, but they are not black and therefore do not meet the criterion. Line 92's line value count is not incremented in response to checking pixels 94 or 96.

FIG. 10 shows steps in obtaining the line value counts for lines through a pivot location in each of a number of directions. The step in box 110 begins an outer iterative loop that handles each of the directions. The step in box 112 increments the distance count, and begins an inner iterative loop that follows a line in the next direction, counting pixels that meet a criterion.

The step in box 114 checks to see that the distance count does not exceed the distance limit. If the distance count indicates a valid distance, the step in box 116 accesses data defining the next location in the current direction. The step in box 118 checks to see if the accessed location meets the criterion, and if so the step in box 120 increments the line value count. For example, if the criterion is black, the line value count will be incremented each time the accessed location is a black pixel. If the accessed location does not meet the criterion, the line value count is not incremented.

If the distance count indicates that the distance limit has been exceeded, the line value count containing the number of locations in the direction which meet the criterion is stored in the step in box 122 in a data structure for access by direction. The step in box 124 increments a direction count to keep track of the number of directions measured, and resets the distance count to zero before checking for more directions in box 110. If there are no remaining directions, the step in box 126 returns the data structure containing the line value counts for the pivot location.

The steps in FIG. 11 show a method for obtaining an approximation of variance of line value counts for each direction for an image. The step in box 130 begins an iterative loop that handles a number of pivot locations for which line value counts are obtained. These locations can be randomly selected as described in copending, coassigned U.S. patent application Ser. No. 07/737,956, entitled "Image Analysis based on Location Sampling," incorporated herein by reference. If there are pivot locations remaining, the step in box 132 computes the line value counts at the next location, using the method shown in FIG. 10. The step in box 134 then squares each of the line value counts for the current pivot location, and combines them with previous squared line value counts by adding each squared count to the sum of squared counts in the same direction from previous pivot locations. The sums can be temporarily stored in a similar data structure accessible by direction. The resulting sum-of-squares counts indicate variance of line value counts in each direction.

If there are no remaining pivot locations, the step in box 136 returns the data structure with the sums of squared counts. As discussed in relation to FIG. 8, the steps in boxes 134 and 136 can be allocated differently. For example, all of the line value counts could be obtained and stored, omitting the step in box 134 entirely, and then the step in box 136 could square the line value counts, add the squared counts for each direction, and return the results. The choice of how to implement these steps can depend on efficiency or other practical considerations.

Figure 12:
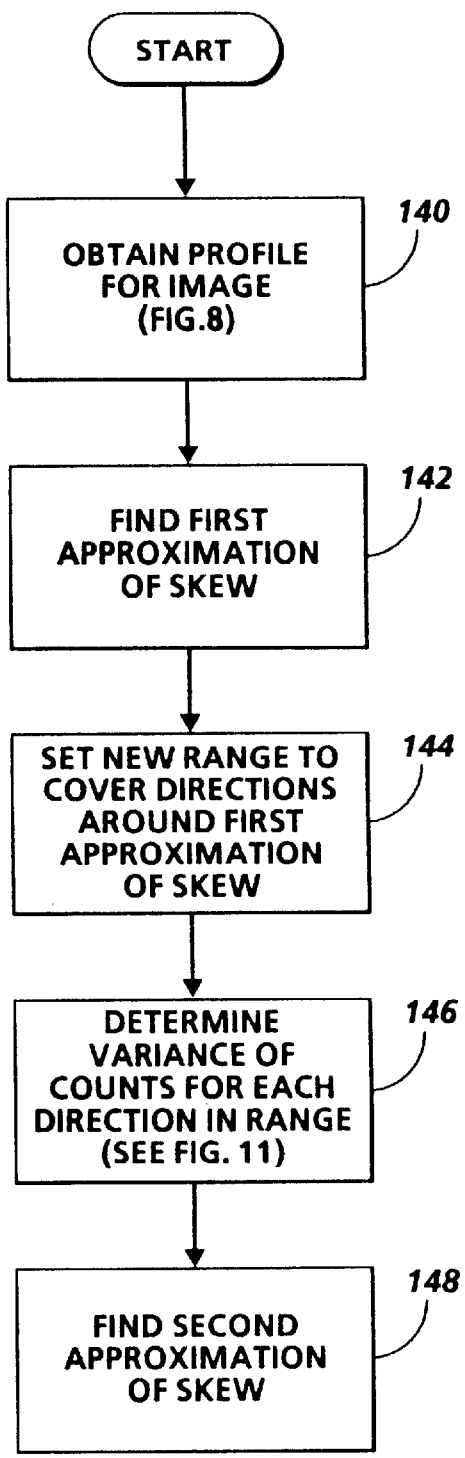
FIG. 12 is a flow chart showing a method for determining skew that uses the steps in FIGS. 8 and 11 to obtain first and second approximations of skew.

FIG. 12 shows a method for determining skew in a manner similar to that shown in FIGS. 2–5, by obtaining a first approximation of skew, followed by obtaining a more precise approximation of skew based on the first approximation.

The step in box 140 obtains a profile for an image. This may be done using a technique similar to that shown in FIG. 8. This profile is used in the step in box 142 to obtain a first approximation of the skew of the image by finding the deepest minima of the profile.

The step in box 144 sets a new range for obtaining a more precise skew approximation. The new range covers directions around the first skew approximation. This new range may be determined using the difference between directions of measurement in the step in box 140.

The step in box 146 determines variances of the line value counts for each direction that falls within the range determined in box 144. This may done using a technique similar to that shown in FIG. 11, using sum-of-squares to indicate variance. The step in box 148 finds the second approximation of skew by finding the direction at which the variance in line value counts is the greatest.

C. An Implementation

The general features described above could be implemented in numerous ways on various machines to measure skew of lines in an image.

Figure 13:
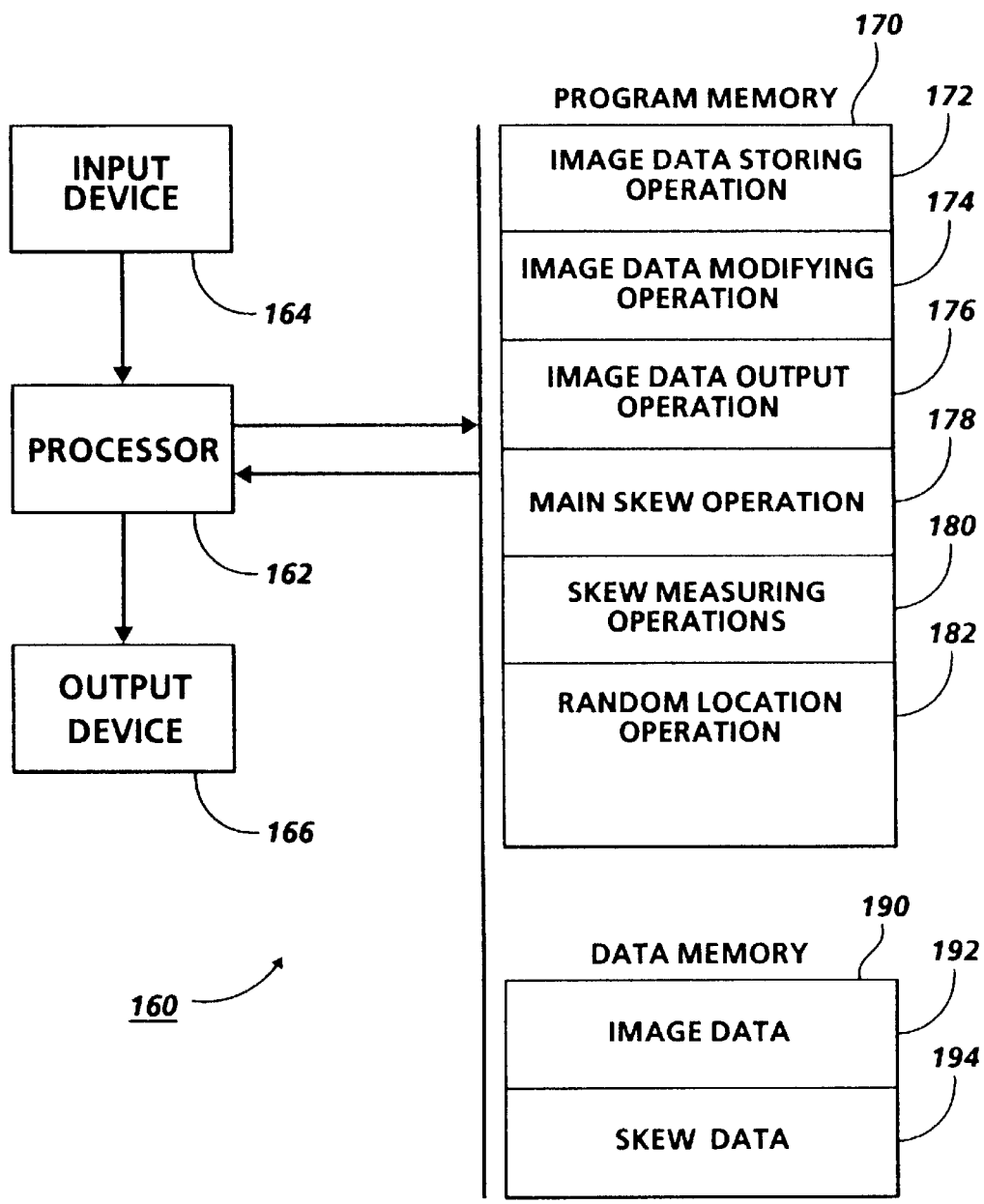
FIG. 13 is a schematic block diagram of a system in which the invention is implemented on a serial machine.

FIG. 13 shows system 160 in which the invention is implemented on a serial machine. Processor 162 is connected for receiving input data from input device 164 and for providing output data to output device 166. Processor 162 can be the CPU of a workstation, and input device 164 and output device 166 can be I/O devices. For example, input device 164 can be an image input device such as a scanner or a digital image source such as a peripheral storage device or other storage or transmission medium. Similarly, output device 166 can be a device for providing data obtained by processor 162, such as data indicating a skew direction, to a storage or transmission medium.

During operation, processor 162 executes instructions from program memory 170 and accesses data memory 190 to read and write data. Program memory 170 stores instructions for various operations of processor 162. Data memory 190 stores data structures as shown and can also temporarily store intermediate data used by processor 162 in performing its operations.

Image data storing operation 172 receives image data through input device 164 and stores it in data memory 190, and image data modifying operation 174 modifies image data 192. Similarly, image data output operation 176 provides image data 192 to output device 166.

Main skew operation 178 can call skew measuring operations 180 to obtain a first approximation of skew and then to obtain a second more precise approximation of skew. Main skew operation 178 and skew measuring operations 180 can call random location operation 182 in order to obtain data identifying a location to be sampled.

Image data 192 in data memory 190 includes data indicating a value for each pixel of an image. Image data 192 can be stored by image storing operation 172. Skew data 194 can store data which indicates approximate skew of the image.

Figure 14:
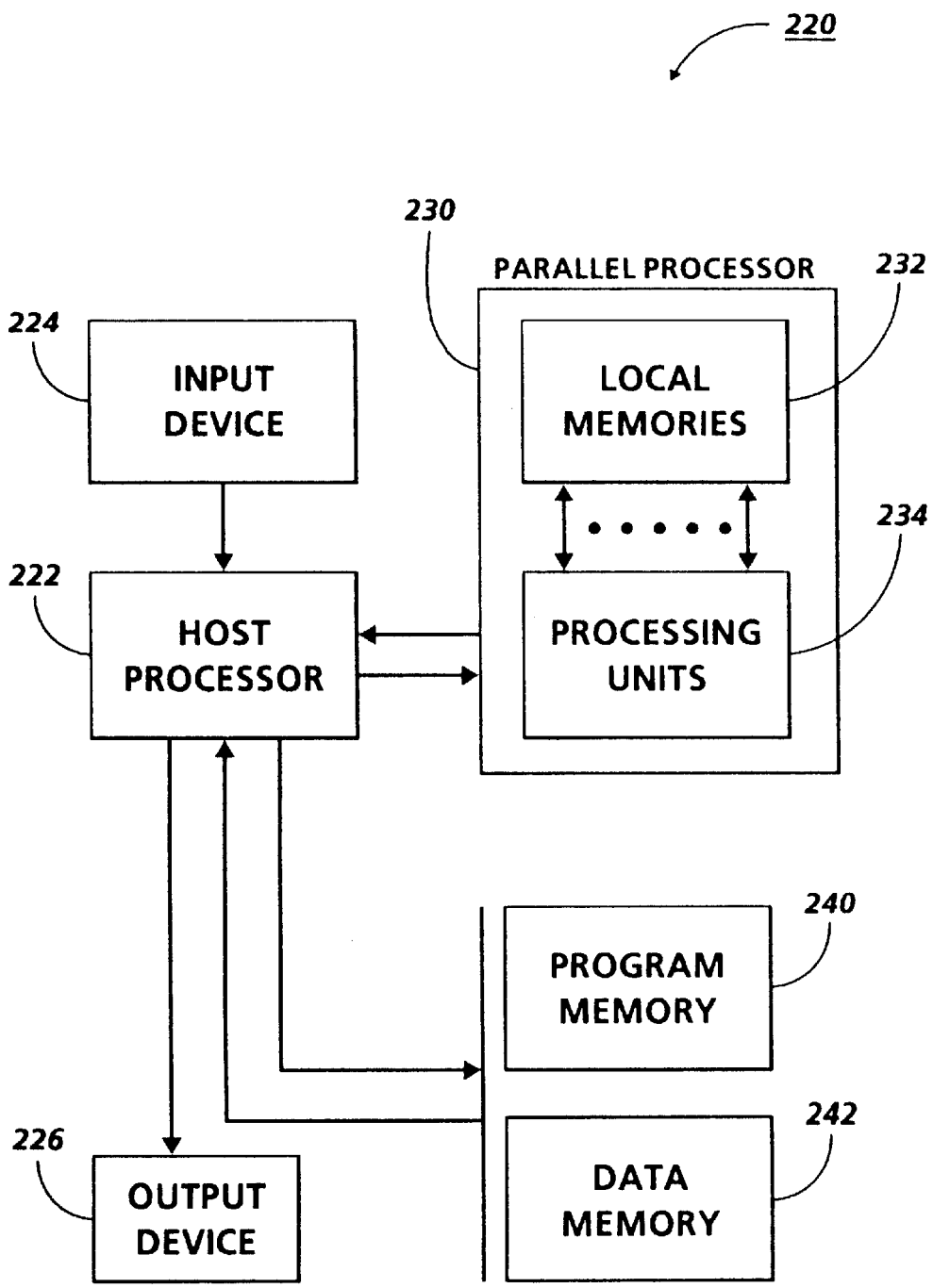
FIG. 14 is a schematic block diagram of a system in which the invention is implemented on a parallel machine.

The invention can alternatively be implemented on a parallel machine. FIG. 14 shows components of a parallel machine on which the invention could be implemented.

System 220 in FIG. 14 resembles system 160 in FIG. 13. System 220 includes host processor 222 connected to receive data from input device 224 and to provide data to output device 226. Host processor 222 is also connected to exchange data with parallel processor 230, which could, for example, be a Connection Machine from Thinking Machines Corporation. Parallel processor 230 includes processing units 234, each with local memory 232. Data defining an image can be stored in local memory 232 so that each pixel's value is stored in a respective processing unit's local memory. Each processing unit can store the respective value of one or more pixels in its local memory. Host processor 222 executes instructions from program memory 240 and accesses data memory 242 in performing image processing, as described above in relation to FIG. 13. Host processor 222 performs operations that include operating each pixel's respective processing unit in parallel to measure skew for an image as a whole.

Figure 15A:
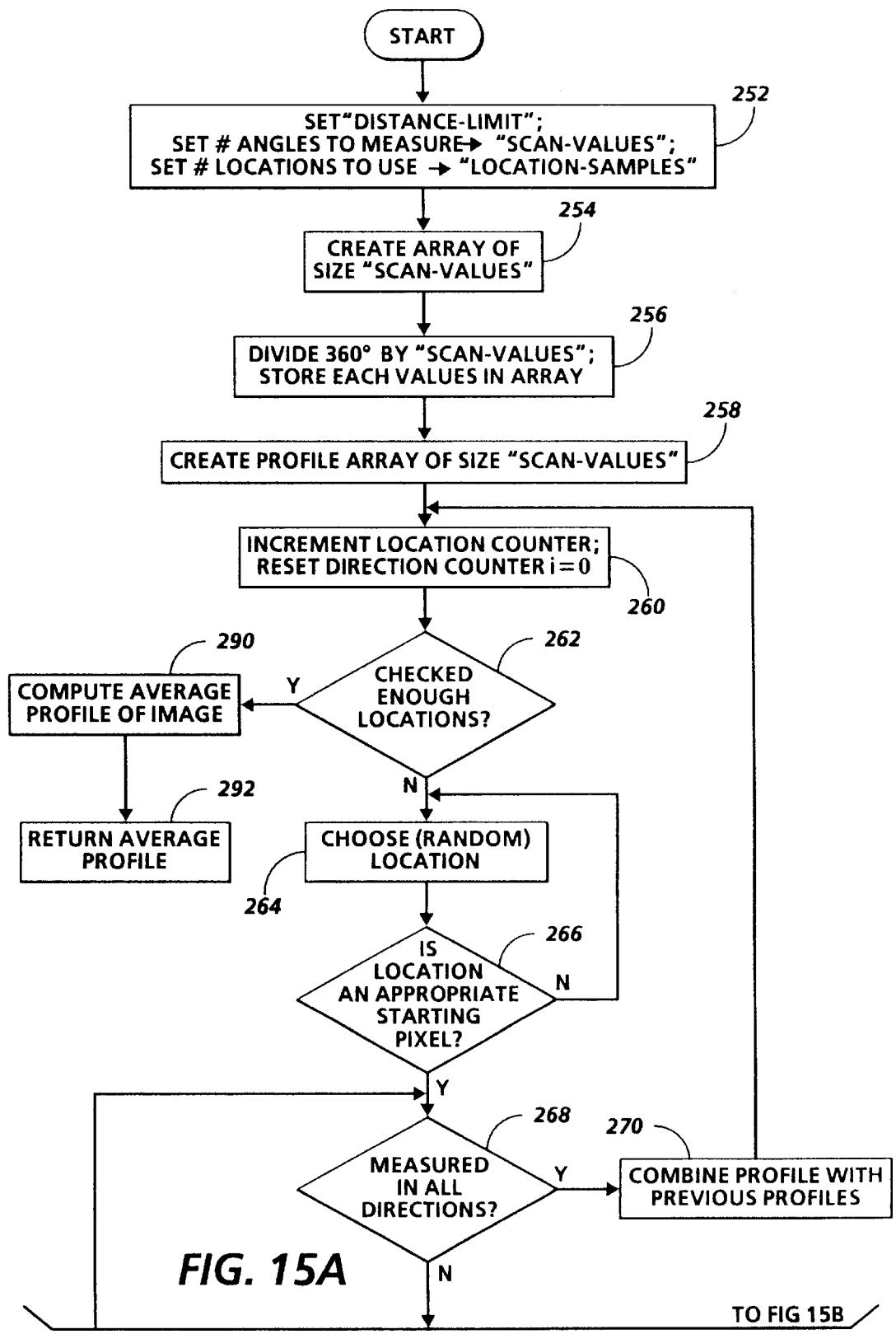
FIGS. 15A and 15B are a flow chart of steps in producing a profile of distance as a function of direction.
Figure 15B:
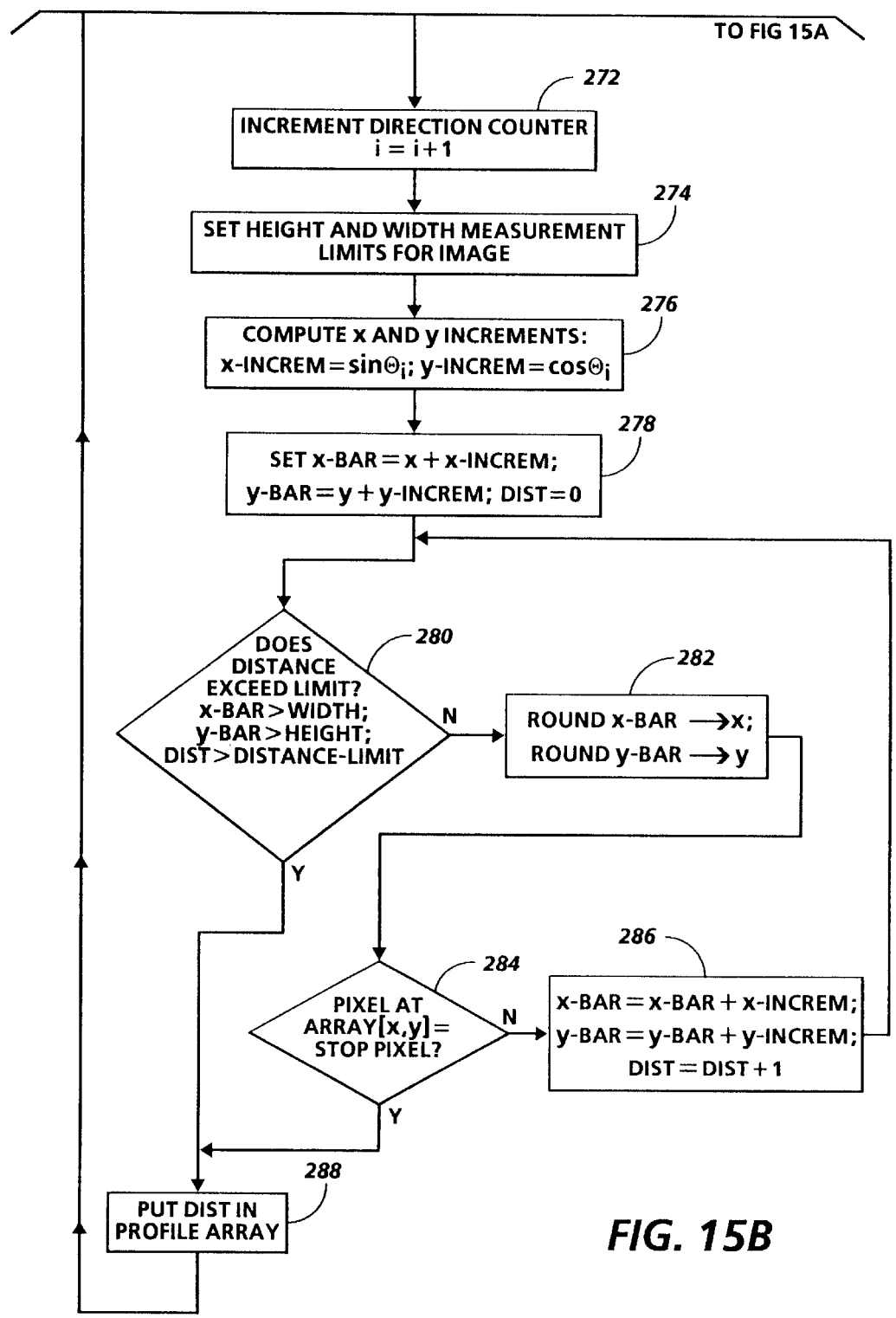
Figure 16:
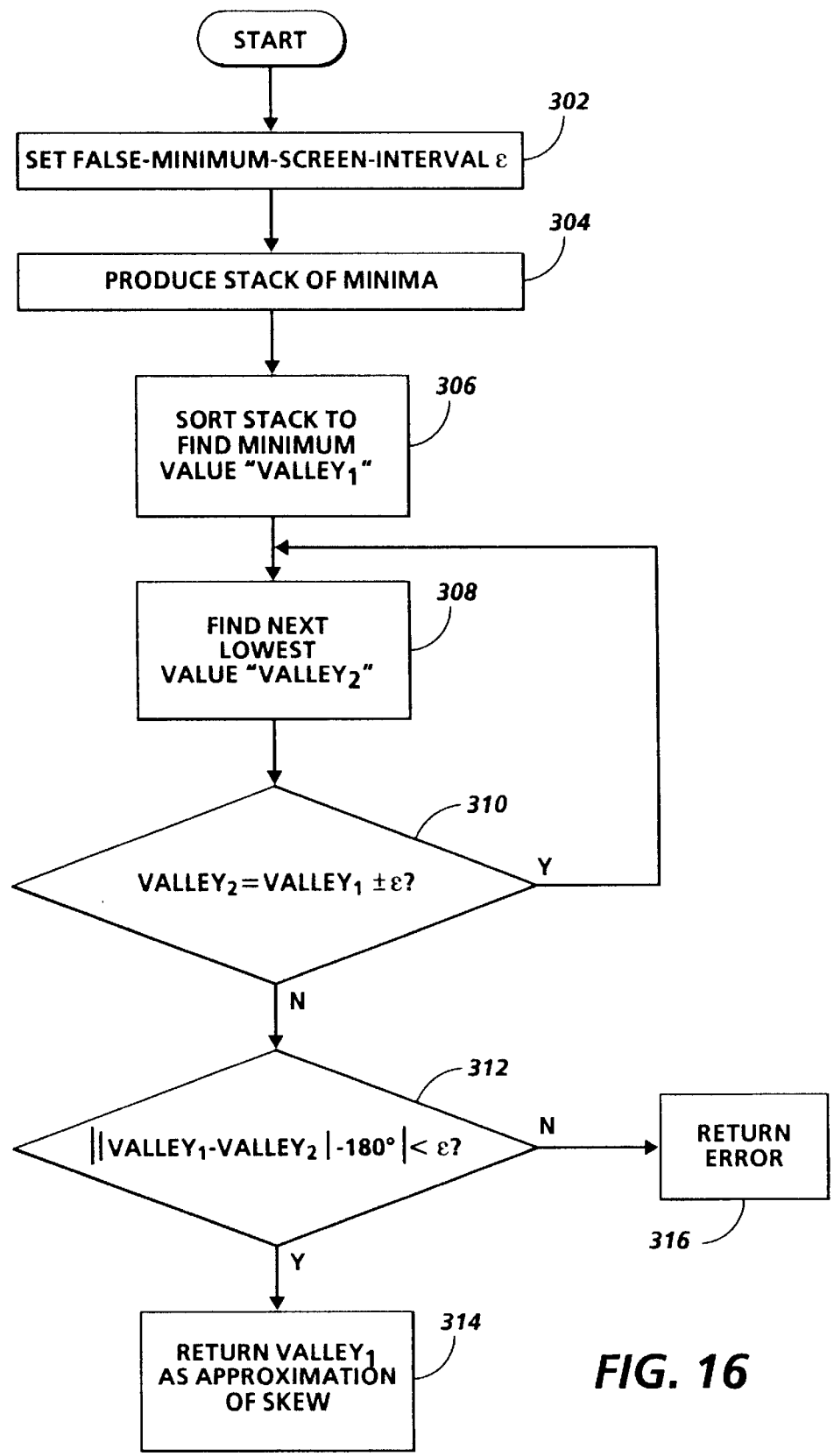
FIG. 16 is a flow chart of steps in using the profile produced in FIGS. 15A and 15B to find an approximation of skew.
Figure 17:
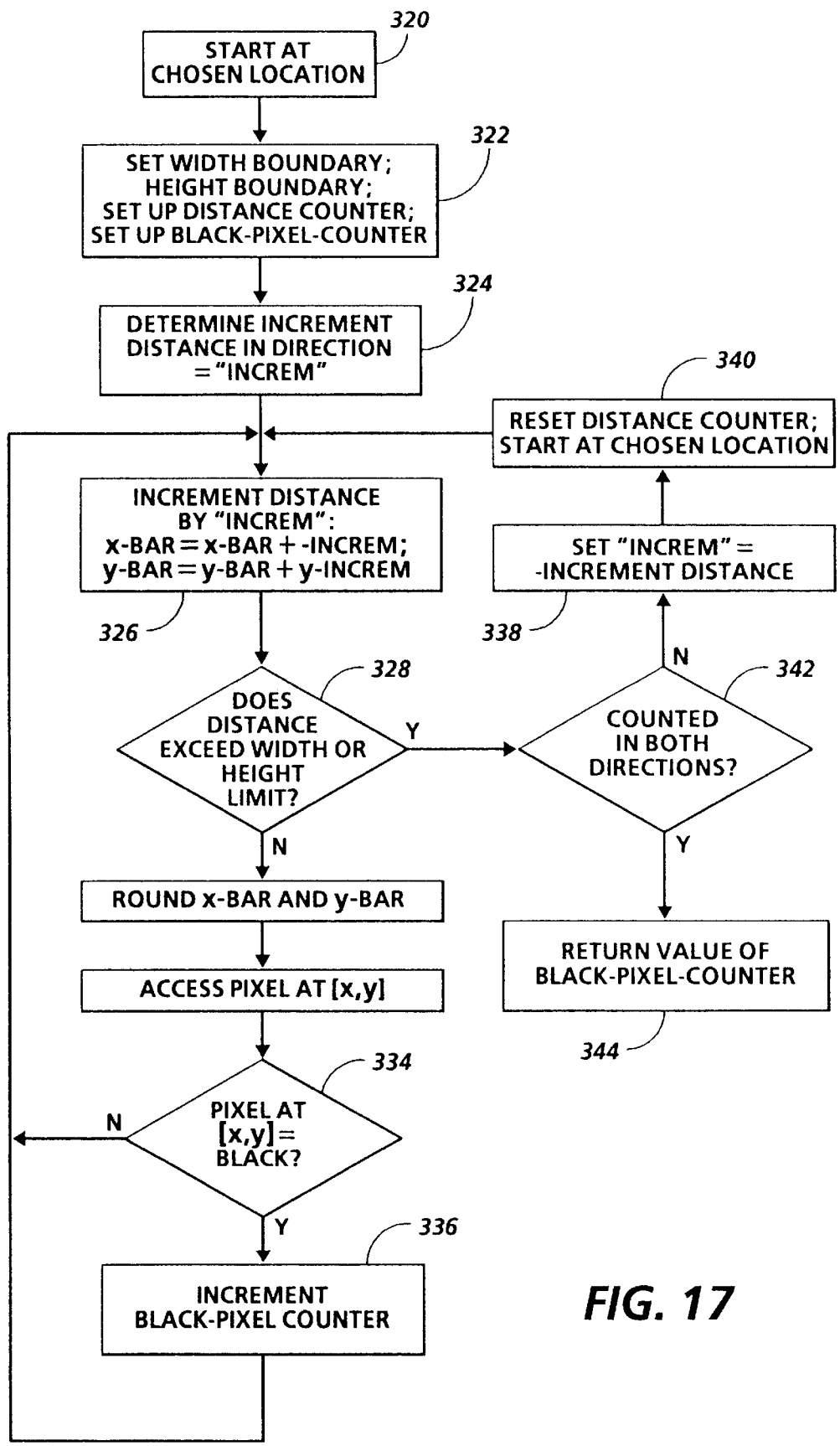
FIG. 17 is a flow chart of steps in counting black pixels in a line.
Figure 18:
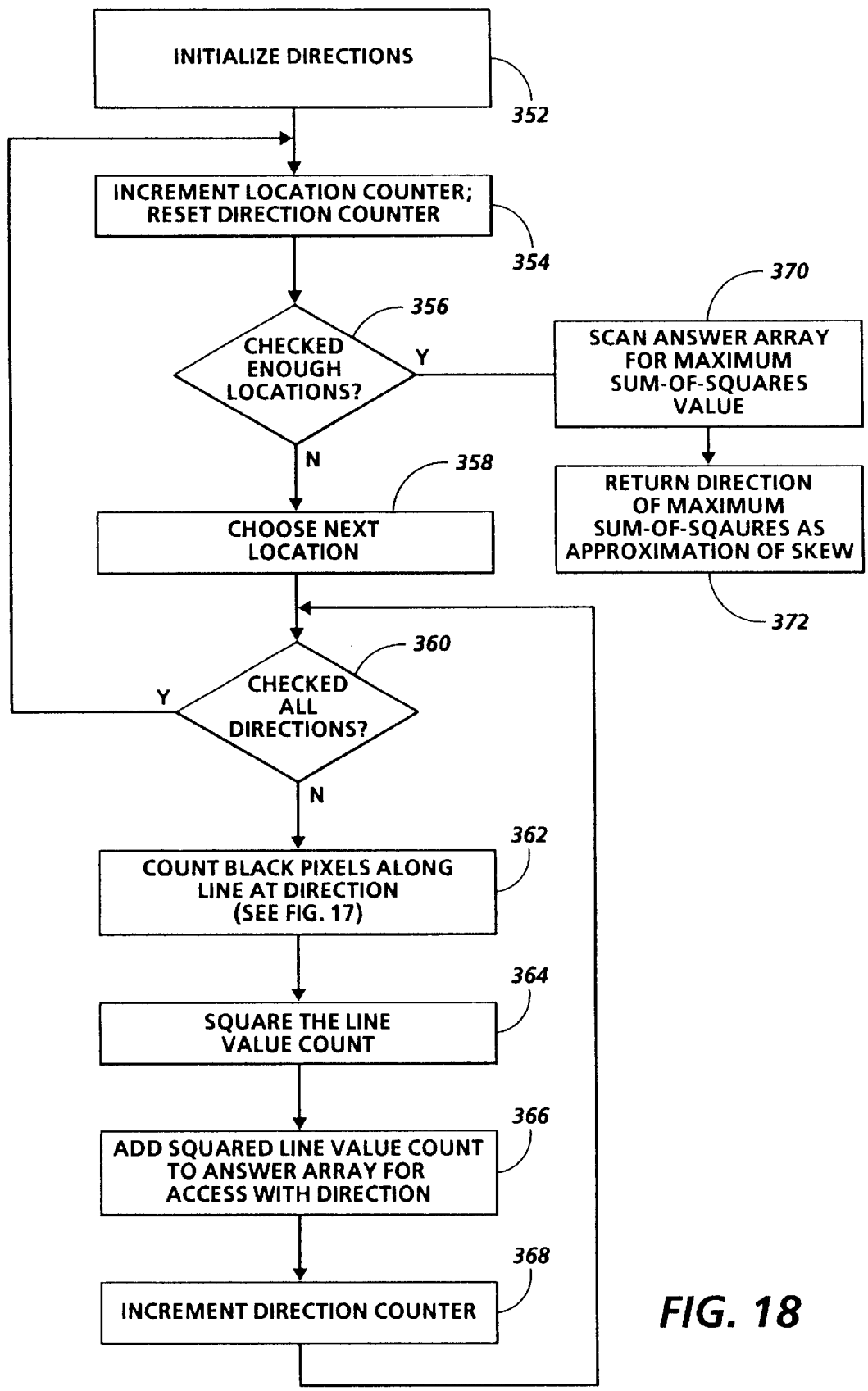
FIG. 18 is a flow chart of steps in using the count from FIG. 17 to find an approximation of skew.
Figure 19:
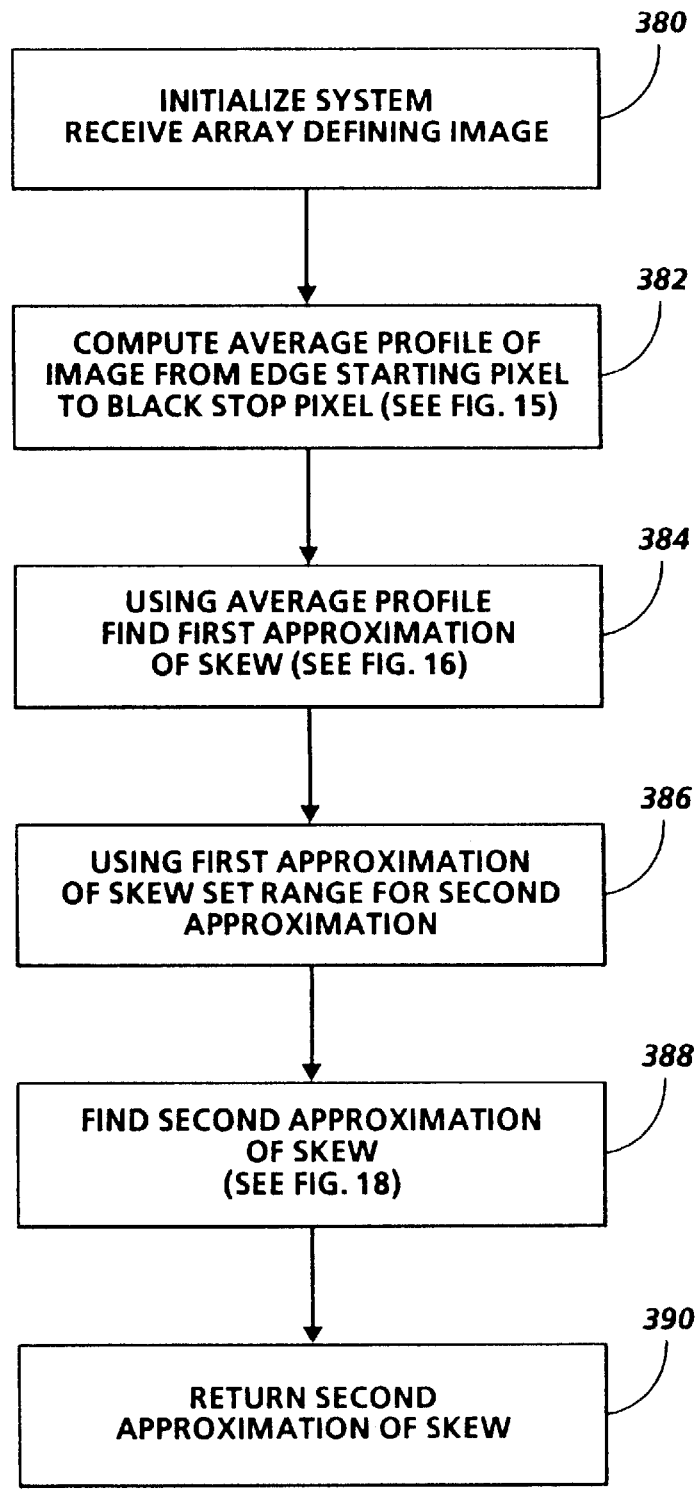
FIG. 19 is a flow chart of steps that obtain a first approximation as in FIG. 16, then obtain a second, more precise approximation as in FIG. 18.

FIGS. 15A–19 show an implementation of operations that could be performed by system 160 of FIG. 13. FIGS. 15A and 15B is shows an operation that produces a profile of distance as a function of direction that provides information about skew. FIG. 16 shows an operation that uses the profile to find an approximation of skew of text in an image. FIG. 17 shows an operation that counts the number of black pixels in a line, and FIG. 18 shows an operation that uses this line count value to find an approximation of the skew. FIG. 19 shows an operation that uses the technique of FIG. 16 to find a first approximation of skew of an image, uses the first approximation to set a range, and then uses the range to find a second approximation of skew of the image using the technique of FIG. 18.

FIGS. 15A and 15B show a method of obtaining a profile of the distance as a function of direction for an image for use in measuring skew. The step in box 252 sets constants, including scan-values, indicating the number of directions to be used; location-samples, indicating the number of locations to be used in characterizing the image; a distance-limit.

The constant distance-limit may be set to a value sufficiently greater than the interline spacing of the image to detect distances between adjacent lines of text. For example, in one set of images the technique has worked well with distance-limit set to 70.

Because the directions are obtained by dividing 360° by scan-values, a larger value for scan-values detects image characteristics with greater resolution. Satisfactory resolution has been obtained for skew with scan-values set to values around 24.

Satisfactory results have been obtained with location-samples set to 1000 and to 3000. Greater values for location-samples require more computation but may not achieve greater accuracy, once an appropriate level of statistical significance has been reached. The resolution of the image received and the particular characteristic being measured may affect the value required to obtain satisfactory measurements. Factors useful in determining an appropriate value for location-samples are described in copending, coassigned U.S. patent application Ser. No. 07/737,956, entitled "Image Analysis Based on Location Sampling," incorporated herein by reference.

Appropriate values of scan-values and location-samples may be determined experimentally or by statistical analysis. In general, a satisfactory value for a given measurement on a given image can be obtained by increasing each of these constants until further increase does not improve reliability of results.

The step in box 254 creates an array with scan-values size. This array will be used to store the scan directions of a segmented circle. To obtain the scan directions, the step in box 256 divides the value of the circle, 360°, by scan-values. Each direction can be stored in the array as an angle offset from some direction such as vertical down (i.e., 0°=↓).

The step in box 258 creates another array, the profile array. This array also has a size of scan-values, and will be used to store the distance measurements for each direction.

The step in box 260 begins an iterative loop by resetting the direction counter to zero, and incrementing the location counter to keep track of the number of locations sampled. The step in box 262 checks for location-samples iterations.

If location-samples locations have not yet been sampled, the step in box 264 chooses another location. This may be a random or pseudorandom choice.

The step of box 266 checks to make sure that the location is an appropriate choice for a starting pixel, depending on the application. For some applications, the starting pixel should be white, for others black. Additional properties, such as whether the pixel is on the edge of a component, may also be desired. For detecting the skew of an image, a pixel located on an edge of a component may be used as the starting pixel.

If the chosen pixel does not have the desired properties, no measurements are made from the pixel and the system returns to box 264 to obtain another location. Alternatively, an array with location-samples appropriate pixels could be determined in advance, and a step of accessing the next pixel in the array substituted for the steps in boxes 264 and 266.

If the pixel is appropriate, the step in box 268 checks to see that distances have been measured in scan-values directions. If not, the step in box 272 increments the direction counter for a new direction. The step in box 274 sets limits for the height and width of the image array for the chosen pixel. These may indicate the outside edges of the image, so that measurements need not be taken beyond the edges of the image. The step in box 276 computes increments along the x and y axes for each increment along a line in the new direction. The step in box 278 increments the variables x-bar and y-bar along the line and resets the distance counter dist.

The step in box 280 begins an iterative loop by checking whether the length from the starting pixel is beyond any of the width, height or distance limits. If it is not, the current values of x-bar and y-bar are rounded to integers in order to access a pixel's value in the image array in the step in box 282. The step in box 284 checks to see if the accessed pixel value meets the criterion for stopping. If it does not, the step in box 286 increments x-bar and y-bar and dist, and returns to box 280 to check the limits. If the accessed pixel does meet the stop pixel criterion, distance data dist indicating approximate length from the starting pixel is stored in the profile array by the step in box 288. The system then returns to box 268 which determines whether the distance has been measured in scan-values directions.

If distance has been measured in all the directions, the profile array for the current location is combined with previous profiles in the step in box 270 by adding the distance for each direction to the sum of previous distances in the direction. If enough locations have been sampled at box 262, the average profile is computed in box 290 by dividing the sum of distances for each direction of the combined profile array by the number of locations sampled. The step in box 292 returns the average profile for the image.

FIG. 16 shows an operation that uses the average profile obtained in FIG. 15 to determine an approximate skew of an image. The step in box 302 sets a value for the false-minimum-screen-interval, $\epsilon$. This constant is a margin of error allowing for minima that might occur at directions very close to a minimum value. This constant can be set to 10 degrees, for example. The step in box 304 finds local minima and adds an entry for each to a stack indicating the minimum values. The step in box 306 sorts the stack according to the value at each minimum to find the minimum value in the stack. The direction, $valley_1$, that corresponds to this minimum value in the array is considered the approximate skew of the image.

To check whether $valley_1$ is an approximation of the skew, the step in box 308 finds the next lowest value in the stack, at a direction $valley_2$. The step in box 310 checks to make sure that $valley_2$ is not within the false-minimum-screen-interval $\epsilon$ of $valley_1$. If it is, the step in box 308 picks the next minimum value for $valley_2$. When a $valley_2$ is found which doesn't fall into the $\epsilon$ interval around $valley_1$, the step in box 312 checks to make sure that $valley_2$ is approximately 180° from $valley_1$, showing the skew in the opposite direction across the image. When this is found, the step in box 314 returns the direction corresponding to $valley_1$ as the approximate skew. If the difference between $valley_1$ and $valley_2$ does not fall into the range of (180°−$\epsilon$) to (180°+$\epsilon$), an error is detected. In this case it is likely that the image being analyzed is not a text image, so that an error signal is returned in box 316.

The flowchart of FIG. 17 illustrates a method of counting the pixels in a line at a direction intersecting a chosen location, starting in the step of box 320. As in FIGS. 15A and 15B, the location can be a randomly chosen edge pixel, and can be thought of as a pivot pixel around which directions pivot. The steps in FIG. 17 measure in one direction.

The step in box 322 initializes distance and pixel counters, and sets the height and width boundaries of the image. The step in box 324 determines the incremental distance to measure for each step in the current direction, increm, similar to the step shown in box 276. The step in box 326 increments the distance counter by increm similar to the step in box 286, and the step in box 328 checks to see if the distance exceeds either the height or width limits. If not, the value of x-bar and y-bar at the current distance are rounded in the step of box 330 in a manner similar to that shown in box 282. The step in box 332 accesses the pixel value in the image array which corresponds to the location [x,y], and the step in box 334 checks to see if it is black. If it is, the step in box 336 increments the black-pixel-counter.

When the distance exceeds either the height or width limit at box 328, the step in box 342 checks to see if both directions along the line from the starting location have been measured. If not, the increm increment is set to the negative of its previous value in the step in box 338, and the step in box 340 resets the distance counter and restarts at the same location as in box 320. Each following iteration increments along the line in the opposite direction.

When both directions of the line have been measured at box 342, the step in box 344 returns the value of the black-pixel-counter.

FIG. 18 illustrates an additional method of finding an approximation of the skew of an image.

The step in box 352 initializes the directions within a range. The range for directions may be determined by using a first approximation of skew, such as determined in FIG. 16, and taking an appropriate range to either side of the first approximate skew (first skew±range). This technique has been found to work with range set to the false-minimum-screen-interval $\epsilon$ used to find the first approximation of skew. The directions may be equally spaced at a separation of (2×range/n), where n is one less than the number of directions to be measured and may be the same as scan-values.

The step in box 354 increments a location counter, and resets the direction counter to zero. The step in box 356 checks to see if counts have been made at a sufficient number of locations. If not a sufficient number, the step in box 358 chooses a next location. It has been found that the technique works well with 20 location samples, each of which is a randomly selected black pixel. Factors useful in determining the number of samples that is sufficient and factors in determining an appropriate location for sampling are described in copending, coassigned U.S. patent application Ser. No. 07/737,956, entitled "Image Analysis Based on Location Sampling," incorporated herein by reference.

The step in box 360 begins an inner iterative loop that handles all the directions for the current location. The step in box 362 counts the black pixels on a line through the current location at the next direction, using a technique similar to that shown in FIG. 17.

The line value count is squared in the step in box 364. The step in box 366 adds the squared value for each direction to the value corresponding to the direction in an array answer, accessible by direction to obtain the sum-of-squares value for each direction. The direction counter is incremented in the step in box 368.

If all the directions have been checked in box 360, the routine returns to the step in box 354. When sufficient locations have been handled, the step in box 370 scans the answer array for the direction with the largest sum-of-squares value, indicating that the variance of the line value counts between the lines in that direction is the greatest. The step in box 372 therefore returns the direction at which the maximum sum-of-squares occurred as the approximation of skew. Postl, W., "Detection of Linear Oblique Structures and Skew Scan in Digitized Documents," *Eighth International Conference on Pattern Recognition, Paris, France, Oct. 27–31, 1986, Proceedings,* IEEE Computer Society Press, Washington, D.C., 1986, pp. 687–689, describes a similar sum-of-squares measure of skew.

The flowchart of FIG. 19 uses the methods described above to find an approximation of the skew of an image. The step in box 380 initializes the system and loads the image array which defines the image to be analyzed. If the image data is obtained in a different format than appropriate for the steps being performed, such as in a disk file format or a scanner output format, it must be converted into an array or other appropriate format. The step in box 382 uses the technique of FIGS. 15A and 15B to find an average profile of the image. For this example, each starting pixel can be a black edge pixel, and each stop-pixel another black pixel. Using the average profile, the step in box 384 finds a first approximation of the skew using the technique shown in FIG. 16.

Using the first approximation of skew, the step in box 386 sets a range for the computation of a second approximation. The step in box 388 finds the second approximation using the technique shown in FIG. 18. The step in box 390 returns the second approximation as the approximate skew of the image.

D. Other Implementations

Figure 20:
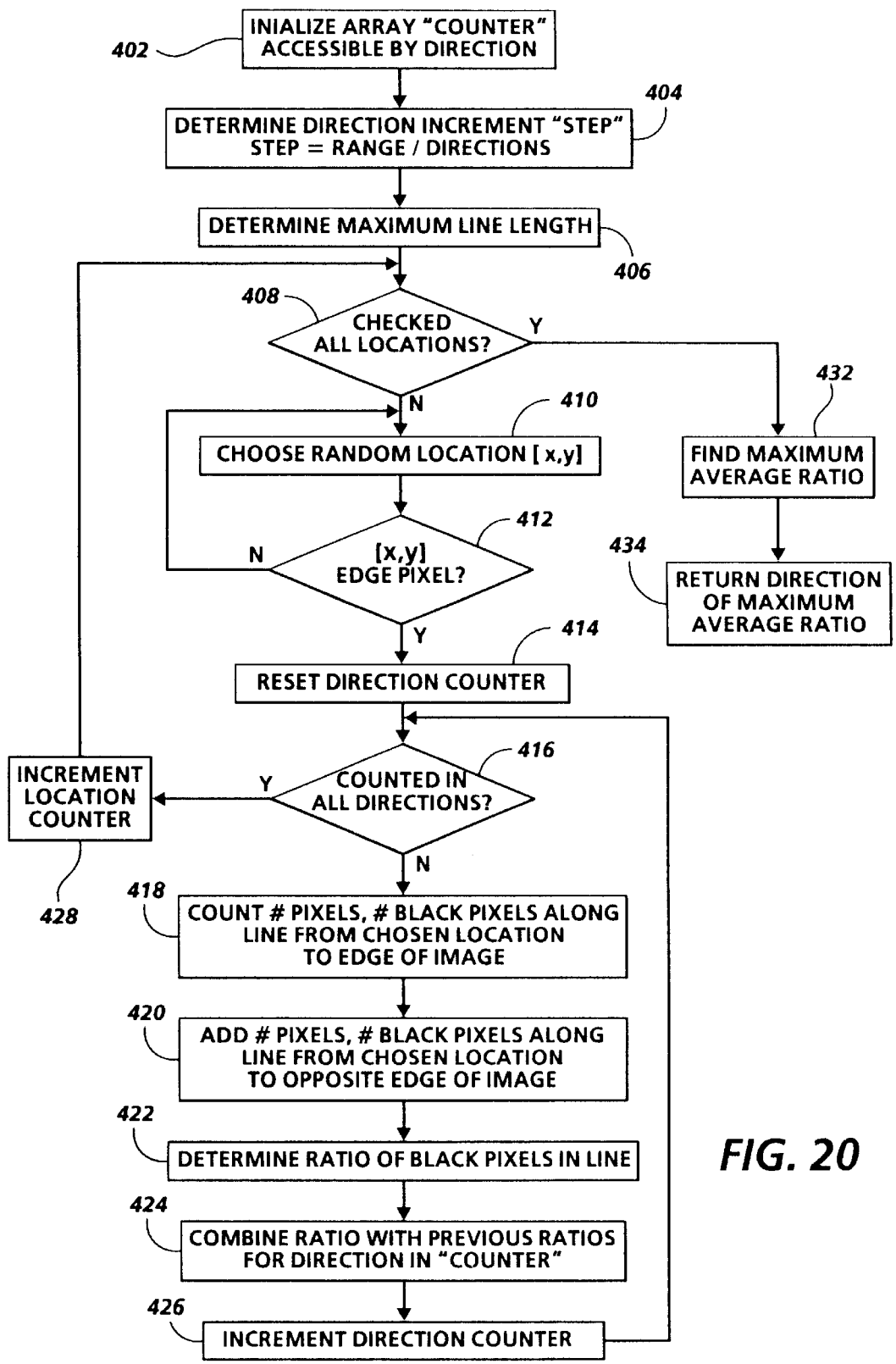
FIG. 20 is a flow chart of steps that obtain an approximation of skew using a count of black pixels in a lines drawn in a range of directions.
Figure 21:
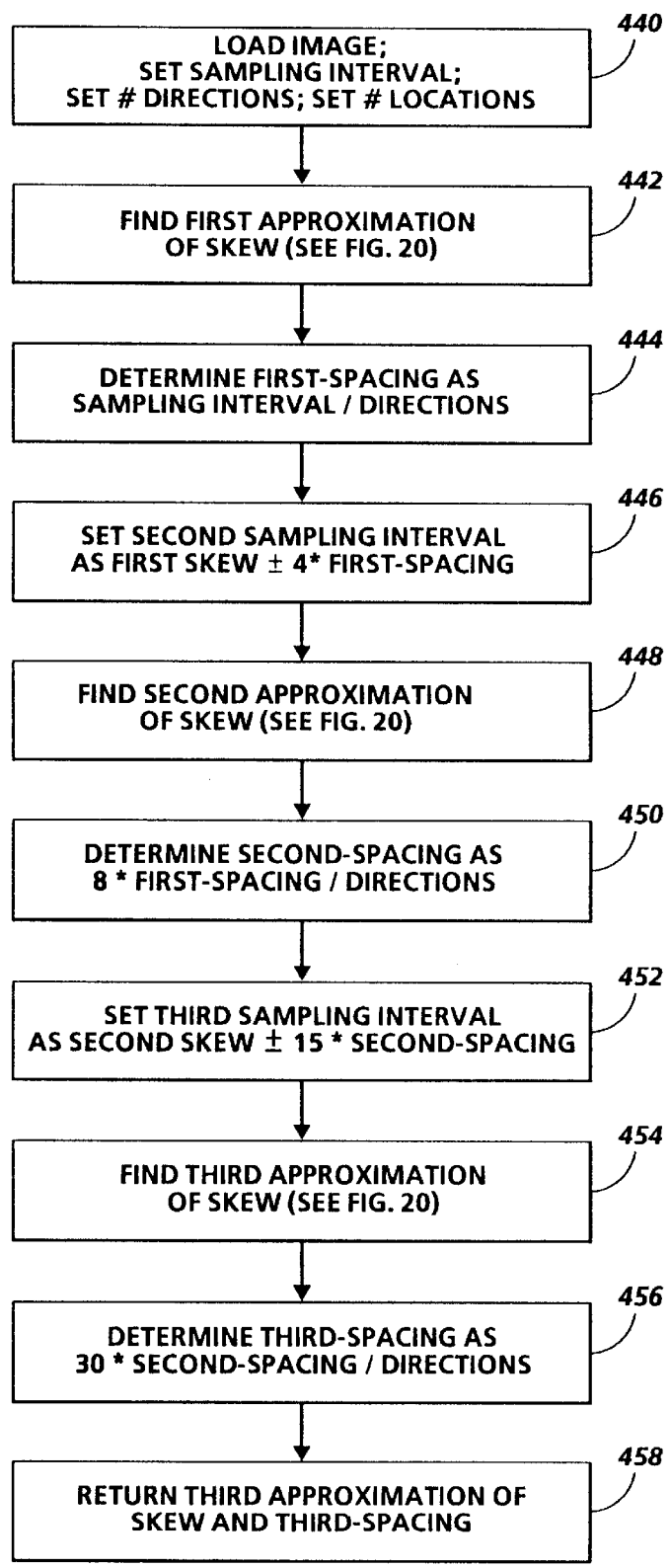
FIG. 21 is a flow chart of steps that obtain three progressively more precise approximations of skew using the steps in FIG. 20.

The flowcharts of FIGS. 20 and 21 illustrate another implementation of the invention. FIG. 20 illustrates a method for finding skew by counting the black pixels in lines drawn in a range of directions in a test image. FIG. 21 performs the steps of the invention by finding an approximation of the skew using the technique of FIG. 20, then finding more precise approximations of the skew using the technique of FIG. 20 with smaller ranges of directions. The steps of FIG. 20 are repeated three times, each time obtaining a more precise approximation of skew.

FIG. 20 shows a method for determining skew by counting pixels intersected by a line as illustrated in FIG. 4. The step in box 402 initializes an array counter. The step in box 404 determines the incremental angle between the directions. This may be done by dividing the range by the number of directions to get equal increments between directions. The step in box 406 determines the maximum allowable length of a line, using the length of a diagonal of the image.

The step in box 408 begins an iterative loop that handles each of a number of locations. The step in box 410 chooses a random pixel. In the step of box 412, the pixel is tested to make sure it is an edge pixel. If it is not, another pixel is chosen in box 410. If the chosen pixel is an edge pixel, the step in box 414 resets the direction counter to zero. The step in box 416 begins an iterative loop that handles each of a number of directions. The step in box 418 counts the black pixels and the total number of pixels intersected by a line at the current direction which intersects the chosen pixel. This may be done by determining a location at the maximum line length in the current direction, and counting the pixels between the chosen location and the determined location. The determined location will usually be beyond the edge of the image, so the method should include a check to stop counting pixels when the edge of the image is reached. The step in box 420 repeats the last step, this time negating the determined location so that it indicates a point off the opposite edge of the image, and adding the pixel counts to those obtained in box 418. The step in box 422 determines the ratio of black pixels to the total number of pixels in the line. The step in box 424 adds the ratio value to previous ratios for the same direction in the array counter.

The step in box 426 increments the direction counter. If all the directions have been handled at the chosen pixel, the step in box 428 increments the location counter. If all locations have been handled, the step in box 432 finds the maximum ratio. An average ratio of black pixels in each direction may be computed if the number of ratios obtained for each direction is different. The direction having the maximum ratio is returned as the skew in the step in box 434.

FIG. 21 uses the method of FIG. 20 in order to find the skew of an image. The step in box 440 loads the image and sets the first sampling interval to a half circle, 180°. Because the technique measures in both directions along a line at each location, measurements will be made around the entire unit circle, 360°. The number of directions to test is set to directions, and the number of locations to test is set to locations. The technique works well with directions set to 72 and locations set to 400. The step in box 442 finds the first approximation of the skew using the technique shown in FIG. 20, with the sampling interval 180° and directions lines.

The approximate error interval first-spacing of the first approximation of the skew is determined by the step in box 444 by dividing the sampling interval by the number of directions. The step in box 446 sets a second sampling interval. The second sampling interval will be more limited than the first sampling interval, and should encompass the direction of the first approximation of the skew. This works well with the second sampling interval set to (first approximation±4*first-spacing), so that the second sampling interval is wider than first-spacing.

The step in box 448 uses the second sampling interval to find the second approximation of the skew using the technique shown in FIG. 20. The second approximation of the skew will be a more precise approximation of the actual skew of the image. The step in box 450 then determines the error range second-spacing by dividing the second sampling interval, 8*first-spacing, by directions. The step in box 452 uses the second-spacing to set a third, smaller, sampling interval. The technique works well with the third sampling interval set to (second approximation of the skew±15*second-spacing). As the approximation gets more precise, the sampling interval decreases more slowly because of the finite number of angles that can practically be measured.

The step in box 454 uses the third sampling interval to find a third approximation of the skew using the technique shown in FIG. 20. The third approximation of the skew will be a more precise approximation of the actual skew of the image than the first or second approximations of the skew. The step in box 456 then determines the third-spacing error range from the third sampling interval and directions, with third-spacing set to (30*second-spacing/directions).

The step in box 458 returns the direction of the third approximation of the skew and the third-spacing error range. The steps in boxes 452–456 could be repeated in order to get an even more precise skew determination, but it has been found that performing the technique of FIG. 20 three times provides a sufficiently precise approximation of the actual skew.

FIGS. 20 and 21 show that the general technique illustrated in FIG. 1 could be implemented in many ways other than the implementation described in relation to FIGS. 13–19. Several successively more precise approximations could be obtained, and any appropriate skew measurement technique could be used to obtain each approximation. Examples of other skew measurement techniques that might be useful in implementing the invention include those described in copending coassigned U.S. patent application Ser. Nos. 07/448,774, entitled "Method and Apparatus for Identification of Document Skew," and 07/454,339, entitled "Determination of Image Skew Angle from Data Including Data in Compressed Form," both of which are incorporated herein by reference.

E. Applications

Figure 22:
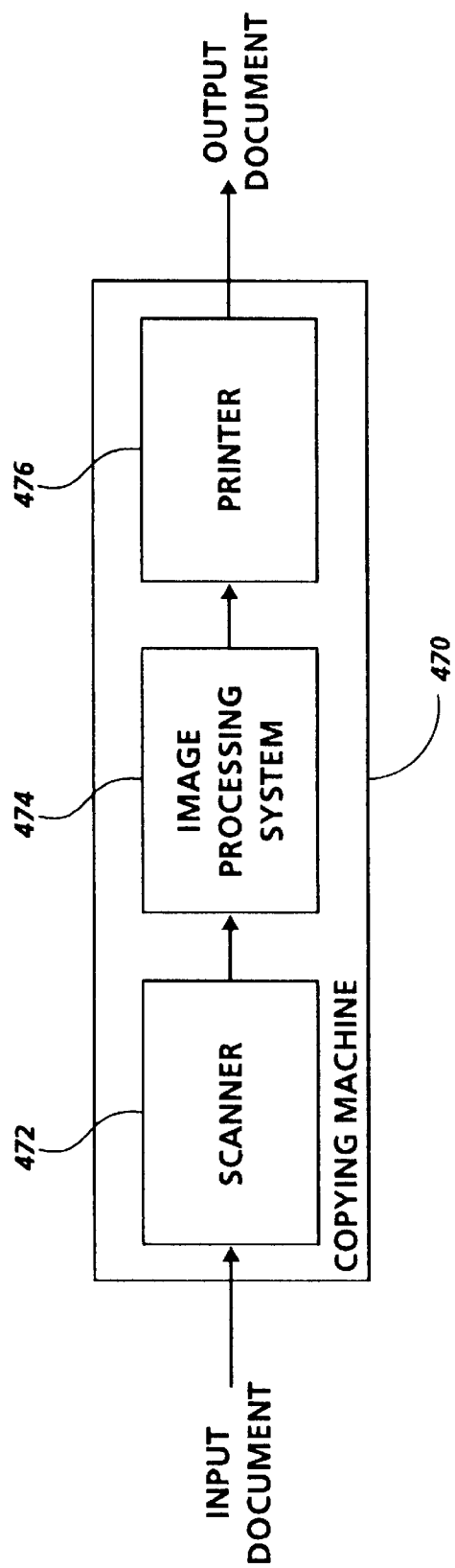
FIG. 22 is a schematic block diagram of a copying machine that includes an image processing system that measures skew of an image.

The invention could be applied in many ways. FIG. 22 illustrates a copying application.

In FIG. 22, copying machine 470 includes scanner 472, image processing system 474, and printer 476. Scanner 472 can produce data defining an image of an input document. Image processing system 474 can be implemented as shown in FIG. 13 or FIG. 14 to detect skew. Image processing system 474 might also apply techniques to detect image skew to produce data defining a corrected image in which lines of text in the input document image are replaced by a correct version of the same text at the appropriate skew. The data defining the corrected image could then be provided to printer 476 to print an output document.

Data indicating the results of skew approximation could be used in other ways. For example, skew data could be stored on a suitable memory medium for later use. Skew data for an image could be stored with or transmitted with data defining the image. In addition to image processing applications, skew data could be used to control servos to change orientation of scanners or of a document being scanned.

F. Source Code Appendices

Appendix A is Common Lisp source code implementing some of the features described above. Appendix B is C source code implementing some of the features described above. The source code in Appendix A, when executed on a Sun-4 workstation, and the source code in appendix B, when executed on a SunSparcstation-2 workstation, each perform iterative refinement of skew measurement as described above.

The code in Appendices A and B, when executed, generally follows the implementations described above, with Appendix A generally following the implementation described in relation to FIGS. 15–19 and Appendix B generally following the implementation described in relation to FIGS. 20–21. Nonetheless, the code may differ from the above description in various ways. For example, the code may be divided into procedures or routines differently than described above.

The following are included in Appendix A:

The function initialize returns an array with values of angles computed from a range divided by the number of scan values.

The function scan-along-line determines the distance along a line from an edge pixel to the next black pixel.

The function build-histogram computes a profile array of distances at directions for a location.

The function create-random-histogram builds an average profile array over a number of points in the image.

The function find-max-hist-pos finds the maximum of values stored in an array.

The function hist-to-list changes and array to a list for computations.

The function decide2 scans the average profile array for valleys. It also screens the valleys for additional valleys within a false peak range, and checks to see that the two resulting minimum valleys fall approximately 180° apart.

The function top-level-rough is the main function for the first approximation of skew computation. It performs the basic functions for setting up the random number generator, and determining the minimum peaks in an average profile of an image.

The function clean-random is used to reset the random number generator.

The function find-orientation-squared is the main function for the second approximation of skew computation. find-orientation-squared uses the first approximation of skew and the region to be checked, and squares the results of counting the line count values.

The function return-random-black-points returns an array with a number of randomly chosen black points.

The function tabulate-line2 counts the number of black pixels and white pixels which lie along a line.

The function fine-tune-bloom is the main program for processing the image. It obtains a first approximation by calling top-level-rough, and then calls find-orientation-squared to find the second approximation of skew.

The following are included in Appendix B;

The function Fine finds an approximation of skew using an angle range and number of directions.

The function RandomEdgePixel finds random black edge pixels.

The function main is the main program for processing the image. The function computes error ranges and obtains successive approximations of skew by repeatedly calling the function Fine.

The function CountLine finds the fraction of black pixels on a line.

The function CountLine1Bit counts the black pixels and total number of pixels on a line.

The function ReadPixel finds the color of a pixel in an image given the coordinates of the pixel in the image.

G. Miscellaneous

The invention has been described in relation to implementations in which operations are performed on data defining an image to obtain data indicating information about skew direction of lines in the image, such as lines of text. The invention might also be implemented with specialized circuitry connected to photosensors for directly obtaining data indicating information about skew direction of lines in an image.

The invention has also been described mainly in relation to images that include text. The invention might also be implemented for images that include graphical lines, such as lines in horizontal or vertical directions.

The invention has been described in relation to software implementations, but the invention might be implemented with specialized hardware.

The invention has also been described in relation to implementations in which distances are measured and variances are obtained from randomly selected locations. The locations could alternatively be selected with some other criterion, such as all pixels interior to connected components, all pixels at edges, or every Nth interior or edge pixel. Furthermore, it might not be necessary to measure distance in each direction from a given location; instead, distance might be measured from a different set of starting locations for each direction.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

© Copyright 1990 Xerox Corporation   All Rights Reserved

;;;; Code for Page orientation measurement and Font identification.

;;; Code requires:::

;;;system "ais" to be loaded. This does the conversions of bit maps.
;;;plotting code in "bd:>dph>ora>plot" These are not important for the
;;; algorithm.

;;; How to run:

;;; Top-level-rough just provides a rough estimate of the location of
;;; the valleys. It returns a list of pairs of the estimates...

;;; All of these are controled by the global constants:
;;; In retrospect, I think most of them should be parameterized.

(zl:defvar white-pix 0) ;;; Be careful about these settings.
(zl:defvar black-pix 1)
(zl:defvar boundary 70) ; This is the maximum distance the scan-along-line function may go.
(zl:defvar scan-values 24) ; The number of directions scanned.
(zl:defvar direction-array nil) ;Eventually this will be the array holding the angles.
(zl:defvar precise-scan-values 30) ; Used when the algorithm locks in on a valley.
(zl:defvar random-point-samples 3000); The number of times to check.
(zl:defvar valley-threshold .1) ; The percentage where the valley begins.
(zl:defvar ceiling-threshold .4) ;;; This is the location of the ceiling. Used to
  ;;; Calculate the distances between lines.
;;;
;;; The function in here "build-histogram" is parameterized by
;;; the stop and start pixels.
;;;; The skew routine uses a black start and a black stop pixel.

;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;
;;;;;;;;;;;; Main Code
;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;

(defun initialize (scan-values begin end)
;Get everything rolling....
;;;Returns an array with the circle divided up into
;;; scan-value slices begining with the very beginning
;;; and continuing until the last end. Used in the code
;;; to set the angles.

A-1

```
;;;
(let ((direction-array (make-array scan-values)))

(if (< end begin) (setq end (+ 360 end)))

(do ((i 0 (1+ i)) (increm (/ (- end begin) scan-values)))
          ((= i scan-values))
    (setf (aref direction-array i) (mod (+ begin (* i increm)) 360)))
    direction-array))

(defun scan-along-line (arr x y angle stop-pix)
;Scans along a line defined by the angle until it finds a white
;pixel. Then it keeps going until it finds a pixel equal to stop
;;pixel.
  (multiple-value-bind (width height ignore) (decode-raster-array arr)
;;;
;;; Set up the increments. Take care of infinities and divide by zeros.
;;;

(setq width (1- width))
  (setq height (1- height))
  (let* ((x-increm (sind angle)) (y-increm (cosd angle))
          (x-bar (+ x x-increm)) (y-bar (+ y y-increm)) (dist 0)

(dist-increm 1))                              ; These are for counting out the steps.

;;;      (pprint (list "--- x:" x-increm " y:" y-increm))

(cond ((not (or (>= x-bar width) (>= y-bar height) (< x-bar 0) (< y-bar 0)
                    (= (raster-aref arr (round x-bar) (round y-bar)) stop-pix)))

(do ((stopp nil))
                ;; Start becomes true at the first white-pix. Then count
                ;; until the first black one upon which stopp becomes true.
                ((or stopp (> dist boundary) (>= x-bar width) (>= y-bar height)
                    (< x-bar 0) (< y-bar 0)))

;;;              (print (list stopp x-bar y-bar (raster-aref arr (round x-bar) (round y-bar))))

(if (= (raster-aref arr (round x-bar) (round y-bar)) stop-pix)
                  (setq stopp t))

(setq x-bar (+ x-bar x-increm))
              (setq y-bar (+ y-bar y-increm))
              (setq dist (+ dist dist-increm)))

;return the final distance.
            dist)
          (t 0)))))
```

```
(defun build-histogram (arr x y direction-array stop-color)
;arr is the array. (x,y) is the point for which
; the calling function would like to know the
; histogram of the distance (scan-along-line)
; function.

; Note that the angles to be scanned are computed
;; initially in the initialization function. Then (let ((answer (make-array scan-values)))

(do ((i 0 (1+ i)))
           ((= i scan-values))
     (setf (aref answer i)
             (scan-along-line arr x y (aref direction-array i) stop-color)))

answer))

(defun create-random-histogram (arr num direction-array ran-seed pick-color stop-color)
;; Takes an array, chooses a num of points at random and
;; computes the histo-gram which results. This histogram contains
;; the average distance versus theta function. I ;; pick-color is the color of the points chosen at random.
;; stop-color is the color the scanning goes through until it stops.

(multiple-value-bind (width height ignore) (decode-raster-array arr)

(let* ((ran-loco ran-seed)
             (scan-values (si:decode-array direction-array))
             (answer (make-array scan-values :initial-element 0)) (count 0)
             (normalize (make-array scan-values :initial-element 0))
             (wid (- width 2)) (hei (- height 2)))

(do ((local-answer nil)
             (x (1+ (random wid ran-loco)) (1+ (random wid ran-loco)))
             (y (1+ (random hei ran-loco)) (1+ (random hei ran-loco))))

((= count num))          ;; Count is only incremememted when (x,y) = black-pix

;;;         (pprint (list x y (raster-aref arr x y)))
             (cond ((and (= pick-color (raster-aref arr x y))
                             (or  (/= pick-color (raster-aref arr (1+ x) y))  ;;; Just precludes
                                  (/= pick-color (raster-aref arr (1- x) y))     ;;; edge pixels.
                                  (/= pick-color (raster-aref arr x (1+ y)))
                                  (/= pick-color (raster-aref arr (1+ x) (1+ y)))
```

A-3

```
                    (/ = pick-color (raster-aref arr (1- x) (1 + y)))
                    (/ = pick-color (raster-aref arr x (1- y)))
                    (/ = pick-color (raster-aref arr (1 + x) (1- y)))
                    (/ = pick-color (raster-aref arr (1- x) (1- y)))))
              (setq local-answer (build-histogram arr x y direction-array stop-color))
           ;;       (print-hist local-answer)
              (do ((j 0 (1 + j)))
                  ((= j scan-values))
                  (setf (aref answer j) (+ (aref answer j) (aref local-answer j)))
                  (if (< 0 (aref local-answer j))
                      (setf (aref normalize j) (1 + (aref normalize j)))))

(setq count (1 + count)))))
     (do ((j 0 (1 + j)))
         ((= j scan-values))
     ;;;     (print (list "answer" (aref answer j) "count" (aref normalize j)))
         (if (< 0 (aref normalize j))
             (setf (aref answer j) (/ (aref answer j) (aref normalize j)))
             (setf (aref answer j) 0)))
     answer)))

;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;
;;;;;;;;;;;;; Selection functions.
;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;

(defun find-max-hist-pos (arr)
 (let ((answer (aref arr 0)) (answer2 0))
  (do ((i 1 (1 + i)) (max (si:decode-array arr)))
    ((= max i))
    (cond ((> (aref arr i) answer)
           (setq answer (aref arr i)) (setq answer2 i))))

answer2))

(defun hist-to-list (arr)
 (let ((answer nil))
  (do ((i 0 (1 + i)) (max (si:decode-array arr)))
    ((= max i))
    (push (aref arr i) answer))
  (reverse answer)))

;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;
;;;;;;;;;;;;; Decision machinery
;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;
```

```
(defun decide2 (arr direction-array &optional (false-peak-screen-interval 20))
  ;;; This version sorts the location of the valleys and tries to find if there
  ;;; are several near by... It is, in particular, looking for valleys
  ;;; which are 180 degrees apart. It is programmed to ignore false peaks within
  ;;; the false-peak-screen-interval from the real minimum.

(let ((len (si:decode-array arr))
        (answer nil) (going-down t))
   (do ((i 1 (1+ i))) ((= i len))
;;;    (pprint (list i (aref arr i) (aref arr (1- i)) going-down answer))
     (if (< (aref arr i) (aref arr (1- i)))
         (setq going-down t)
         (cond (going-down
                (push (list (float (aref arr i)) (aref direction-array i)) answer)
                (setq going-down nil))))))

(setq answer (sort answer #'< :key 'car))
  (let ((mark-angle (cadr (car answer)))
        (i (cdr answer)))

(do ()
       ((< false-peak-screen-interval (abs (- mark-angle (cadr (car i)))))
        (setq i (cdr i)))
      ;;; Keep going until a peak is found whick lies outside of the range.
      (if (> false-peak-screen-interval (abs (- (abs (- mark-angle (cadr (car i)))) 180)))
          (list (list (mod (- mark-angle false-peak-screen-interval) 360)
                      (mod (+ mark-angle false-peak-screen-interval) 360))
                (list (mod (+ 180 (- mark-angle false-peak-screen-interval)) 360)
                      (mod (+ 180 mark-angle false-peak-screen-interval) 360)))
          nil))))
```

;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;
;;;;;;;;;;;; Top level dispatching functions....;;;;;;;;;;;
;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;

;;;; A note about the random state.
;;;; The current functions are set up to reuse the same random
;;;; state over and over again. This allows repeatability. If
;;;; you want to reset the random number generator, just run
;;;; clean random as you will notice some of the test programs
;;;; will do.

```
(defun top-level-rough (image)
  ;;;This is the central dispatching function. First it tries the lowest
  ;;;resolution and keeps going until it finds two peaks. Then it stopss...
```

A-5

```
(let* ((ran-state (make-random-state)) ;;freezes the random state for local focusing.
       (ran-state-var (make-random-state ran-state))
       (init-array (initialize scan-values 0 360))
       (histo (create-random-histogram image random-point-samples
                                       init-array ran-state-var black-pix black-pix))
       (bottom (find-min-hist histo))
       (cut-off (+ (* valley-threshold (- (find-max-hist histo)
                                          bottom)) bottom))
       (decision (decide2 histo init-array )));;; cut-off)));;; Cut-off isn't needed for 2.
;;;;(break)
  (pprint (list "Initial angles:" scan-values "Points" random-point-samples "Cut-Off" cut-off))
  (plot::plot (hist-to-list init-array) (hist-to-list histo) :size '(400 300))
  decision))

(defun clean-random ()
;;; This is necessary to clean out the random number generator.
;;; Resets it to produce new random numbers.
  (do ((i 0 (1+ i))) ((= i random-point-samples)) (random 100)))

;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;
;;;;;; Finds the max. These are the top level for the second half.
;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;

(defun find-orientation-squared (arr rough-estimate error divisions points)
;;; Takes an array and a rough estimate and runs tabulate line
;;; on all the divisions values between rough-estimate +/- error.
;;; points is a list of points to be tried.

(let* ((angles (initialize divisions (- rough-estimate error)
                                       (+ rough-estimate error)))
         (answer (make-array divisions :initial-element 0)))

(mapcar #'(lambda (a)

(let ((mid (car a)) (row (cadr a)))

(do ((i 0 (1+ i)))
                      ((= i divisions))
                    (setf (aref answer i) (+ (aref answer i)
                                             (square (tabulate-line2 arr mid row
                                                                     (aref angles i))))))))
            points)
```

```
(plot::plot (hist-to-list angles) (hist-to-list answer) :size '(170 170))
(aref angles (find-max-hist-pos answer))))

(defun return-random-black-points (arr number)
;;; Returns number random points in arr (multiple-value-bind (width height ignore) (decode-raster-array arr)
   (let ((answer nil) (count 0))

(do ((x (random width) (random width))
          (y (random height) (random height)))
         ((= count number))
         (cond ((= (raster-aref arr x y) black-pix)
                (setq count (1+ count))
                (push (list x y) answer))))
    answer)))

(defun return-random-points (arr number)
;;; Returns number random points in arr (multiple-value-bind (width height ignore) (decode-raster-array arr)
   (let ((answer nil) (count 0))

(do ((x (random width) (random width))
          (y (random height) (random height)))
         ((= count number))

(setq count (1+ count))
             (push (list x y) answer))
    answer)))
```

;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;
;;;;;;;;;;;; Tabulating functions.
;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;
;;; Different ways to count the pixels along a line.

```
(defun tabulate-line2 (arr x y angle)
;;; Counts the number of black-pix and white-pix which
;;; lie along a line. This one just returns the number of black pixels.

(multiple-value-bind (width height ignore) (decode-raster-array arr)
    (setq width (1- width)) (setq height (1- height)) ;; boundary problems (let ((x-increm (sind angle)) (y-increm (cosd angle))
          (black-answer 0) (white-answer 1))
```

```
                (do ((i (+ x x-increm) (+ i x-increm))
                     (j (+ y y-increm) (+ j y-increm)))
                    ((or (> = i width) (> = j height) (< = i 1) (< = j 1)))
;;;;            (pprint (list i j (raster-aref arr (round i) (round j))))
                 (if (= (raster-aref arr (round i) (round j)) black-pix)
                     (setq black-answer (1 + black-answer))
                     (setq white-answer (1 + white-answer))))

;;;; Do it in the other direction now!!!!
                (setq x-increm (* -1 x-increm))
                (setq y-increm (* -1 y-increm))

(do ((i (+ x x-increm) (+ i x-increm))
                     (j (+ y y-increm) (+ j y-increm)))
                    ((or (> = i width) (> = j height) (< = i 1) (< = j 1)))
;;;;            (pprint (list i j (raster-aref arr (round i) (round j))))
                 (if (= (raster-aref arr (round i) (round j)) black-pix)
                     (setq black-answer (1 + black-answer))
                     (setq white-answer (1 + white-answer))))
;;;;    (pprint (list angle black-answer white-answer))
                 black-answer )))

;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;
;;;;;; The overlords
;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;

(defun square (a) (* a a))

(defun fine-tune-bloom (image)
;;;Does everything for the image. Does one rough pass of the random
;;; algorithm then goes precise finds all the points from the other.

;;; Note that there are some constants here that should be sussed out.
;;; Namely the number of image points (currently 20). More of these
;;; should only increase accuracy. The number 32 is the amount
;;; of gradiations that the first image is segmented into.

(let ((rough-estimate (top-level-rough image)))
  (pprint (list "Rough Estimate: " rough-estimate))
  (if rough-estimate
          (let* ((left (caar rough-estimate)) (right (cadar rough-estimate))
                 (difference (/ (- right left) 2))
                 (results
                        (find-orientation-squared image (+ left difference) difference
                                                  (round (* difference 8 ))
```

```
                                                        (return-random-black-points image 20))))
            (print (list "Average: " (float results)))
            (mod results 180)))))

;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;
;;;;;;;;;;;; Other Subroutines
;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;

(defun point-member (point lst)
; A local kludge of the member function to handle
; the fact that member doesn't work too well for
; lists of lists.

(let ((x (car point)) (y (cadr point)) (stop nil))

(do* ((ls lst (cdr ls)) (frst (car lst) (car ls)))
        ((or (null ls) stop))

(if (and (= x (car frst)) (= y (cadr frst)))
            (setq stop (list x y))))
  stop))

(defun find-min-hist (arr)
 (let ((answer (aref arr 0)))
  (do ((i 1 (1+ i)) (max (si:decode-array arr)))
     ((= max i))
   (if (<= (aref arr i) answer) (setq answer (aref arr i))))
  answer))

(defun find-min-hist-pos (arr)
 (let ((answer (aref arr 0)) (answer2 0))
  (do ((i 1 (1+ i)) (max (si:decode-array arr)))
     ((= max i))
   (cond ((< (aref arr i) answer)
           (setq answer (aref arr i)) (setq answer2 i))))

answer2))

(defun find-max-hist (arr)
 (let ((answer (aref arr 0)))
  (do ((i 1 (1+ i)) (max (si:decode-array arr)))
     ((= max i))
   (if (> (aref arr i) answer) (setq answer (aref arr i))))
  answer))

;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;
;;;;;;;;;;;; Decision machinery
```

```
;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;
(defun return-minimum-intervals (arr threshold )
;; Returns a list of intervals where the value in arr
;; is less than a threshold.

(let* ((yes nil) ;;; this holds the current left side of the interval if one exists.
       (width (1- (si:decode-array arr)))
       (i (1- width))
       (answer nil))

(cond ((<= (aref arr 0) threshold) ;;; trouble!@%&* walk backwards.
         (do ()
             ((> (aref arr i) threshold))
           (setq i (1- i)))
         (if (< i (1- width)) (setq yes i))))

(do ((j 0 (1+ j)))
      ((= width j))
    ;; (pprint (list yes j threshold (aref arr j)))
    (cond ((and yes (> (aref arr j) threshold))
           (push (list yes (1- j)) answer)
           (setq yes nil))
          ((and (not yes) (<= (aref arr j) threshold))
           (setq yes j))))

(cond ((and yes (> (aref arr 0) threshold))
         (push (list yes width) answer)))
  answer))

(defun return-wide-minimum-intervals (arr threshold )
;; Returns a list of intervals where the value in arr
;; is less than a threshold.
;; Note that this function has been modified to return intervals one wider.

(let* ((yes nil) ;;; this holds the current left side of the interval if one exists.
       (width (1- (si:decode-array arr)))
       (i (1- width))
       (answer nil))

(cond ((<= (aref arr 0) threshold) ;;; trouble!@%&* walk backwards.
         (do ()
             ((> (aref arr i) threshold))
           (setq i (1- i)))
         (if (< i (1- width)) (setq yes i))))

(do ((j 0 (1+ j)))
      ((= width j))
    ;; (pprint (list yes j threshold (aref arr j)))
    (cond ((and yes (> (aref arr j) threshold))
           (push (list (mod (1- yes) width) j) answer)
           (setq yes nil))
          ((and (not yes) (<= (aref arr j) threshold))
           (setq yes j))))
```

```
(cond ((and yes (> (aref arr 0) threshold))
            (push (list (mod (1- yes) width) 0) answer)))
    answer))

(defun widen-intervals (lst)
;;; lst is a list of pairs. widen-interval subtracts one from the first
;;; and adds one to the second.

(let ((answer nil))

(do ((ll lst (cdr ll)))
            ((null ll))
      (push (list (1- (car (car ll))) (1+ (cadr (car ll)))) answer))

(reverse answer)))

(defun decide (arr direction-array cut-off)
;; Finds the min and the max, split the difference according to
;; some percentage and then see if there are two and only
;; two valleys at the point. If there are, well, see if
;; they are about 180 degrees apart.

(let* ((ints (mapcar #'(lambda (b)
                            (mapcar #'(lambda (a) (aref direction-array a)) b))
                        (return-wide-minimum-intervals arr cut-off))))
                                                                    ; (break)
    (if (= (length ints) 2) ;; Well there are only two valleys, check to see if differ by 180D
        (let* ((a (car ints)) (b (cadr ints))
               (a1 (mod (+ 180 (car a)) 360)) (a2 (mod (+ 180 (cadr a)) 360))
               ;;; Add error bounds in here to a1. +/- however many degrees.
               (b1 (car b)) (b2 (cadr b)))
;;          (break)

(if (or (and (<= a1 b2) (>= a1 b1))
                  (and (<= b1 a2) (>= b1 a1))
                  (and (<= a2 b2) (>= a2 b1))
                  (and (<= b2 a2) (>= b2 a1))
                  (and (or (< a1 b1) (> a1 b2))
                       (or (< a2 b1) (> a2 b2))))
              ;; Note this assumes that the direction-array
              ints nil)                                 ; If successful, return the degree
intervals, lse nil.
          )
        nil)))

(defun plot-histo-bit (arr)
;;; Finds dimensions and goes from there....
;;;
  (let* ((len (si:decode-array arr))
         (init-array (initialize len 0 360)))
    (plot::plot (hist-to-list init-array) (hist-to-list arr) :size '(400 300))))

(defun find-valley-center (ran-state image cut-off end-pair)
;;; Takes an pair of endpoints (in degrees) and runs the same
```

```
;;; random points through them. Finds the center.
;;; Ran-state is a variable to reset everything to the same set of points.

(let* ((ran-state-var (make-random-state ran-state))
          (init-array (initialize precise-scan-values (car end-pair) (cadr end-pair)))
          (histo (create-random-histogram image random-point-samples init-array
                                          ran-state-var black-pix black-pix));;
          (valleys (return-minimum-intervals histo cut-off)))
   (pprint (list "Initial angles:" precise-scan-values "Points" random-point-samples "Cut-Off" cut-off))

(if (< (car end-pair) (cadr end-pair))
          (plot::plot (hist-to-list init-array) (hist-to-list histo) :size '(170 170))
          (plot::plot (mapcar #'(lambda (a) (mod (+ 180 a) 360)) (hist-to-list init-array))
                      (hist-to-list histo) :size '(170 170)))

; (break)
  (cond ((= (length valleys) 1)
          (let ((left (aref init-array (caar valleys)))
                (right (aref init-array (cadar valleys))))
            (list "Minimum/Center:"
                  (float (aref init-array (find-min-hist-pos histo)))
                  (float (mod (+ left (/ (mod (- right left) 360) 2)) 360)))))
         (t (list "Minimum:"
                  (float (aref init-array (find-min-hist-pos histo)))
                  (list "Valleys:" valleys))))))

(defun top-level-rough222 (image)
;;;This is the central dispatching function. First it tries the lowest
;;;resolution and keeps going until it finds two peaks. Then it stopss...

(let* ((ran-state (make-random-state)) ;;freezes the random state for local focusing.
          (ran-state-var (make-random-state ran-state))
          (init-array (initialize 120 0 360))
          (histo (create-random-histogram image random-point-samples
                                          init-array ran-state-var black-pix black-
pix)))
   (plot::plot (hist-to-list init-array) (hist-to-list histo) :size '(170 170))
   histo ))

(defun find-orientation-fine-grey (arr rough-estimate error divisions points)
;;; Takes an array and a rough estimate and runs tabulate line
;;; on all the divisions values between rough-estimate +/- error.
;;; points is a list of points to be tried.
;;; This one is modified to use the tabulate-line-grey to work on grey-level
;;; images.

(let* ((angles (initialize divisions (- rough-estimate error)
                                       (+ rough-estimate error)))
```

```
            (answer (make-array divisions :initial-element 0)))

(mapcar #'(lambda (a)
              (let ((mid (car a)) (row (cadr a)))
                (do ((i 0 (1+ i)))
                    ((= i divisions))
                  (setf (aref answer i) (+ (aref answer i)
                                           (square (float (tabulate-line-grey arr
mid row
(aref angles i)))))))))
              points)

(plot::plot (hist-to-list angles) (hist-to-list answer) :size '(170 170))
  (if (> black-pix white-pix)
      (aref angles (find-max-hist-pos answer))   ;;; Assume that we're looking for
                                ;;; high numbers if black is greater than white.
      (aref angles (find-min-hist-pos answer)))))

(defun tabulate-line-grey (arr x y angle)
;;; Counts the number of black-pix and white-pix which
;;; lie along a line. This one just returns the number of black pixels.

;;; Actually that is the old way the method worked. This method won't
;;; count pixels, it will just sum the values which occur along the
;;; line.

(multiple-value-bind (width height ignore) (decode-raster-array arr)
    (setq width (1- width)) (setq height (1- height)) ;; boundary problems (let ((x-increm (sind angle)) (y-increm (cosd angle))
          (answer 0))

(do ((i (+ x x-increm) (+ i x-increm))
           (j (+ y y-increm) (+ j y-increm)))
          ((or (>= i width) (>= j height) (<= i 1) (<= j 1)))
        (setq answer (+ answer (raster-aref arr (round i) (round j)))))

;;;; Do it in the other direction now!!!!
      (setq x-increm (* -1 x-increm))
      (setq y-increm (* -1 y-increm))

(do ((i (+ x x-increm) (+ i x-increm))
           (j (+ y y-increm) (+ j y-increm)))
          ((or (>= i width) (>= j height) (<= i 1) (<= j 1)))
        (setq answer (+ answer (raster-aref arr (round i) (round j)))))

;;;;    (pprint (list angle black-answer white-answer))
      (float answer))))
```

APPENDIX B

© Copyright 1990 Xerox Corporation All Rights Reserved

```c
#include <stdio.h>
#include <math.h>
#include "boolean.h"
#include "pict.h"
#include "lines.h"

#define ABS(x) (((x)<0)?(-(x)):(x))

extern long random();

int RandomCoordinate(int maxValue)
{
 return (float)(random()&0xffff)*maxValue/0xffff;
} void RandomEdgePixel(Picture pict,int *x, int *y)
{
 while (TRUE) {
  *x = RandomCoordinate(pict->width);
  *y = RandomCoordinate(pict->height);
  if (ReadPixel(pict,*x,*y))
   if (!(ReadPixel(pict,*x+1,*y) &&
          ReadPixel(pict,*x-1,*y) &&
          ReadPixel(pict,*x,*y+1) &&
          ReadPixel(pict,*x,*y-1) &&
          ReadPixel(pict,*x+1,*y+1) &&
          ReadPixel(pict,*x-1,*y-1) &&
          ReadPixel(pict,*x+1,*y-1) &&
          ReadPixel(pict,*x-1,*y+1)))
         return;
 }

} float Fine(Picture pict,int fineSamples, int fineDirections,
            float angleStart,float angleEnd, char *plotFile)
{
 int x,y;
 float x2,y2;
 int i,j;
 float *counters;
 float step,angle;
 float maxAngle;
 float maxValue;
 float maxLength;
 FILE *outfile;

counters = (float *)calloc(fineDirections,sizeof(float));
 if (counters == NULL) {
  printf("Fine: cannot allocate memory\n");
```

```
  exit(-1);
 } step = ABS(angleEnd - angleStart)/fineDirections;

maxLength = sqrt((double)(pict->width*pict->width +
                                     pict->height*pict->height));
 for (i=0;i<fineSamples;++i) {
  RandomEdgePixel(pict,&x,&y);
  angle = angleStart;
  for (j=0;j<fineDirections;++j) {
   angle = fmod(angle,2*M_PI);
   x2 = x + maxLength*cos(angle);
   y2 = y + maxLength*sin(angle);
   counters[j] += CountLine(pict,x,y,(int)x2,(int)y2);
   angle += step;
  }
 } angle = angleStart;
 maxAngle = angle;
 maxValue = counters[0];
 for (i=0;i<fineDirections;++i) {
  angle = fmod(angle,2*M_PI);
  if (counters[i]>maxValue) {
   maxAngle = angle;
   maxValue = counters[i];
  }
  angle += step;
 }
 printf("Orientation is at %f(%f)\n",maxAngle,maxAngle/2/M_PI*360);

/* Plot the orientation graph if requested */
 printf("Opening fine orientation plot file\n");
 if ((outfile = fopen(plotFile,"w"))==NULL) {
  printf("Error opening fine orientation plot file.\n");
  exit(-1);
 }
 angle = angleStart;
 for (i=0;i<fineDirections;++i) {
  angle = fmod(angle,2*M_PI);
  fprintf(outfile,"%f %f\n",angle,counters[i]);
  angle += step;
 }
 fprintf(outfile,"\"Fine Distances\n\n");
 fclose(outfile);
  printf("Done writing fine orientation plot file.\n");
 return maxAngle;
} main(argc, argv)
int argc;
char *argv[];
{
```

```
char *inFileName,*coarseOutFileName,*fineOutFileName,*fine2OutFileName;
int fineDirections,fineSamples;
float coarseAngle,fineAngle,fineAngle2;
float firstSpacing,secondSpacing,thirdSpacing;
Picture pict;

if (argc != 7 )
{
 printf("\nUsage: %s infile coarsePlotFile finePlotFile\n",argv[0]);
 printf("    finerPlotFile #directions #samples\n\n");

exit(0);
} inFileName = argv[1];   /* get args */
coarseOutFileName = argv[2];
fineOutFileName = argv[3];
fine2OutFileName = argv[4];
fineDirections = atoi(argv[5]);
fineSamples = atoi(argv[6]);

pict = load_pict(inFileName);
coarseAngle = Fine(pict,fineSamples,fineDirections,
                    0,M_PI,coarseOutFileName);
firstSpacing = (M_PI-0)/fineDirections;
printf("Coarse angle: %f(%f)\n",coarseAngle,coarseAngle/M_PI*180);
printf("Coarse spacing: %f(%f)\n",firstSpacing,firstSpacing/M_PI*180);

fineAngle = Fine(pict,fineSamples,fineDirections,
                    coarseAngle-4*firstSpacing,coarseAngle+4*firstSpacing,
                    fineOutFileName);
secondSpacing = 8*firstSpacing/fineDirections;
printf("Fine angle: %f(%f)\n",fineAngle,fineAngle/M_PI*180);
printf("Fine spacing: %f(%f)\n",secondSpacing,secondSpacing/M_PI*180);

fineAngle2 = Fine(pict,fineSamples,fineDirections,
                    fineAngle-15*secondSpacing,fineAngle+15*secondSpacing,
                    fine2OutFileName);
thirdSpacing = 30*secondSpacing/fineDirections;
printf("Finer angle: %f(%f)\n",fineAngle2,fineAngle2/M_PI*180);
printf("Finer spacing: %f(%f)\n",thirdSpacing,thirdSpacing/M_PI*180);
}
            UCHAR ReadPixel(pict,x,y)
            Picture pict;
            int x,y;
            {
             if (pict->depth == 8)
              return *(pict->data+y*BytesPerScanline(pict)+x);
             else if (pict->depth == 1)
              return ((*(pict->data+y*BytesPerScanline(pict)+(x>>3))) &
                        bitmasks[x%8])?1:0;
             else
              DoError("ReadPixel: only depths of 1 and 8 are supported\n",NULL);
```

B-3

}

```
float CountLine(Picture pict, int x1, int y1, int x2, int y2)
{
 pixelCounter = 0;
 setCounter = 0;
 CountLine1Bit(pict,x1,y1,x2,y2,&setCounter,&pixelCounter);
 CountLine1Bit(pict,x1,y1,x1-(x2-x1),y1-(y2-y1),&setCounter,&pixelCounter);
 return (float)setCounter/pixelCounter;
} void CountLine1Bit(Picture pict,
                   int x1,
                   int y1,
                   int x2,
                   int y2,
                   int *totalSet,
                   int *total)
{
 static int inside = 0;
 int xinc,yinc;
 int distance;
 int left,right,top,bottom;

int uchar_width;
 UCHAR *cursor;
 UCHAR mask;
 int count = 0;
 int pixels = 0;

++inside;
 left = 0;
 right = pict->width-1;
 top = 0;
 bottom = pict->height-1;

if (pict->depth != 1)
  DoError("CountLine1Bit: Only depth 1 is supported.\n",NULL);

uchar_width = pict->uchar_width;
 cursor = pict->data+y1*uchar_width+(x1>>3);
 mask = bitmasks[x1%8];

/* printf("Draw line: (%d,%d)-(%d,%d)\n",x1,y1,x2,y2); */
 /* CASE VERTICAL */
 yinc = y2 - y1;
 xinc = x2 - x1;
 if (xinc > 0) {
  if (yinc > 0) {
           /* Line goes up to the right */
           if (yinc>xinc)
                    distance = -yinc;
```

```
                    else
                            distance = xinc;
            while (((x1 < x2) || (y1 < y2))&&(x1<=right)&&(y1<=bottom)) {
                    if (*cursor & mask)
                            ++count;
                    ++pixels;
                    if (distance > 0) {
                            /* move right */
                            if (mask = = 0x1) {
                                    mask = 0x80;
                                    ++cursor;
                                    }
                            else
                              mask = mask >> 1;
                            x1++;
                            distance -= yinc;
                    } else {
                            /* move up */
                            cursor += uchar_width;
                            y1++;
                            distance += xinc;
                    }
            }
    } else {
     if (-yinc>xinc)
            distance = yinc;
     else
            distance = xinc;
     while (((x1 < x2) || (y1 > y2))&&(x1<=right)&&(y1>=top)) {
            if (*cursor & mask)
              ++count;
            ++pixels;
            if (distance > 0) {
            /* move right */
              if (mask = = 0x1) {
                mask = 0x80;
                ++cursor;
              }
              else
                mask = mask >> 1;
              x1++;
              distance += yinc;
            } else {
            /* move down */
        cursor -= uchar_width;
              y1--;
              distance += xinc;
            }
     }
    }
  } else {
   if (yinc > 0) {
    /* Line goes up to the left */
    if (yinc>-xinc)
```

```
                distance = -yinc;
        else
                distance = -xinc;
        while (((x1 > x2) || (y1 < y2))&&(x1>=left)&&(y1<=bottom)) {
                if (*cursor & mask)
                 ++count;
                ++pixels;
                if (distance > 0) {
                 /* move left */
                 if (mask == 0x80) {
                  mask = 0x1;
                  --cursor;
                 }
                 else
                  mask = mask << 1;
                 x1--;
                 distance -= yinc;
                } else {
                 /* move up */
                 cursor += uchar_width;
                 y1++;
                 distance -= xinc;
                }
        }
 } else {
  if (-yinc>-xinc)
                distance = yinc;
        else
                distance = -xinc;
        while (((x1 > x2) || (y1 > y2))&&(x1>=left)&&(y1>=top)) {
                if (*cursor & mask)
                 ++count;
                ++pixels;
                if (distance > 0) {
                 /* move left */
                 if (mask == 0x80) {
                  mask = 0x1;
                  --cursor;
                 }
                 else
                  mask = mask << 1;
                 x1--;
                 distance += yinc;
                } else {
                 /* move down */
                 cursor -= uchar_width;
                 y1--;
                 distance -= xinc;
                }
  }
 }
}
--inside;
*totalSet += count;
```

```
            *total + = pixels;
          } boolean.h
          typedef int BOOLEAN;
          #define FALSE 0
          #define TRUE (!FALSE)

pict.h
          typedef unsigned char UCHAR;

#define ROUND8(x) ((x%8)?(x+8-x%8):x)
          #define ROUND16(x) ((x%16)?(x+16-x%16):x)
          #define ROUND2(x) ((x%2)?(x+1):x)

typedef int Color;
          #define COLOR_RED 0
          #define COLOR_GREEN 1
          #define COLOR_BLUE 2 typedef struct cmapstruct {
           int numberOfEntries;
           UCHAR *red;
           UCHAR *green;
           UCHAR *blue;
          } ColorMapBody, *ColorMap;

typedef struct pstruct {
           int width;
           int height;
           int depth;
           int uchar_width;
           ColorMap cmap;
           UCHAR *data;
          } PictureBody, *Picture;

void doerror(char *string1,char *string2);

ColorMap NewColorMap(int size);
          void FreeColorMap(ColorMap cmap);
          UCHAR ReadColorValue(ColorMap cmap, Color primary,int index);
```

```
UCHAR WriteColorValue(ColorMap cmap, int index, UCHAR red, UCHAR green,
                      UCHAR blue);
Picture new_pict(int width,int height,int depth);
void free_pict(Picture pict);
Picture load_pict(char *filename);
Picture load_header(FILE *fp);
void write_pict(char *filename,Picture pict);
void write_header(FILE *fp, Picture pict);
/*int BytesPerScanline(Picture pict); */
#define BytesPerScanline(pict) (pict->uchar_width)

UCHAR ReadPixel(Picture pict,int x,int y);
void WritePixel(Picture pict,int x,int y,int color);
void CopyPicture(Picture dest, Picture src);
``` baselines.h
```
List BaseLines(Picture pict,double angle,char *plotFile);
#ifdef foo
int *count,
int **returnCoordx, int **returnCoordy);
#endif
void DrawBaseLines(Picture pict, List pointList, double angle);
```

What is claimed:

1. A machine-implemented method of performing image processing on image data defining an image that includes lines of characters extending in a skew direction, the method comprising acts of:

using the image data to obtain first skew data indicating a first approximation of the skew direction; and using the first skew data to obtain second skew data, the second skew data indicating a second approximation of the skew direction, the second approximation being more precise than the first approximation;

the act of using the image data to obtain first skew data comprising, for each of two or more directions, obtaining respective central value data indicating a central value of distances between characters in the direction.

2. The method of claim 1, further comprising an act of using the second skew data to obtain third skew data, the third skew data indicating a third approximation of the skew direction, the third approximation being more precise than the second approximation.

3. The method of claim 1 in which the image includes connected components forming the characters, the act of using the image data to obtain first skew data further comprising, for each of the directions, obtaining distance data by measuring distance in the direction from a first location at an edge of a first one of the connected components to a second location at an edge of a second one of the connected components.

4. The method of claim 3 in which the image includes pixels, the first and second locations being pixels.

5. The method of claim 1 in which the act of using the image data to obtain first skew data further comprises:

forming a profile from the central value data, the profile indicating central value of distances as a function of direction;

finding two minima separated by approximately 180° within the profile; and obtaining the first skew data so that it indicates a direction of one of the two minima.

6. The method of claim 1 in which the central value of distances is an average.

7. The method of claim 1 in which the act of using the first skew data to obtain the second skew data comprises:

determining which one of two or more nearby directions is closest to the skew direction, each of the nearby directions being at or near the first approximation of the skew direction indicated by the first skew data; and obtaining the second skew data so that it indicates the one of the nearby directions that is closest to the skew direction.

8. The method of claim 7 in which the act of using the first skew data to obtain the second skew data further comprises using the first skew data to obtain nearby direction data, the nearby direction data indicating the nearby directions.

9. The method of claim 8 in which the act of using the image data to obtain the first skew data further comprises obtaining measurement data indicating a measurement in each of two or more initial directions, the initial directions being separated by a separating angle; the act of using the first skew data to obtain nearby direction data comprising using data indicating the separating angle to determine a range of the nearby directions.

10. A machine-implemented method of performing image processing on image data defining an image that includes two or more connected components, the connected components forming lines extending in a skew direction; the method comprising acts of:

using the image data to obtain first skew data indicating a first approximation of the skew direction; and using the first skew data to obtain second skew data, the second skew data indicating a second approximation of the skew direction, the second approximation being more precise than the first approximation;

the act of using the image data to obtain first skew data comprising:

obtaining, for each of a set of locations at edges of connected components, measured distance data indicating distances measured in each of two or more directions to edges of connected components;

operating on the measured distance data to obtain central value data for each direction, each direction's central value data indicating a central value of distances measured in the direction; and using the central value data to obtain the first skew data by finding two directions that are separated by approximately 180° and at which minima of central value of distances occur.

11. A machine-implemented method of performing image processing on image data defining an image that includes lines of characters extending in a skew direction; the method comprising acts of:

using the image data to obtain first skew data indicating a first approximation of the skew direction; and using the first skew data to obtain second skew data, the second skew data indicating a second approximation of the skew direction, the second approximation being more precise than the first approximation;

the act of using the first skew data to obtain second skew data comprising:

determining which one of two or more nearby directions is closest to the skew direction, each of the nearby directions being at or near the first approximation of the skew direction indicated by the first skew data; and obtaining the second skew data so that it indicates the one of the nearby directions that is closest to the skew direction;

the act of determining which one of two or more nearby directions is closest to the skew direction comprising:

for each of the nearby directions, obtaining variance data indicating a respective variance for the nearby direction, the respective variance indicating whether measurements beginning at two or more positions and extending through the image in the nearby direction include some measurements of many locations in characters and other measurements of few locations in characters; and determining which one of the nearby directions has respective variance data that indicates a respective variance larger than the other nearby directions, the one of the nearby directions whose respective variance is largest being closest to the skew direction.

12. The method of claim 12 in which the image includes pixels and connected components, the connected components forming the characters, the pixels including first color pixels in connected components and second color pixels not in connected components; the act of determining which one of two or more nearby directions is closest to the skew direction further comprising, for each of a set of pivot pixels, obtaining respective color data indicating the relative numbers of first color pixels and second color pixels in lines extending through the pivot pixel in each of the nearby directions.

13. The method of claim 12 in which each pivot pixel's color data includes, for each nearby direction, a count of first color pixels in a line extending through the pivot pixel in the nearby direction; each nearby direction's variance data including a sum of squares of counts of first color pixels in lines extending through the pivot pixels in the nearby direction.

14. A machine-implemented method of performing image processing on image data defining an image that includes lines of characters extending in a skew direction; the method comprising acts of:

using the image data to obtain first skew data indicating a first approximation of the skew direction; and using the first skew data to obtain second skew data, the second skew data indicating a second approximation of the skew direction, the second approximation being more precise than the first approximation;

the act of using the image data to obtain first skew data comprising:

for each of two or more initial directions, obtaining variance data indicating a respective variance for the initial direction, the respective variance indicating whether lines extending through the image in the initial direction include some lines with many locations in characters and other lines with few locations in characters; and determining which one of the initial directions has respective variance data that indicates a respective variance larger than the other initial directions, the one of the initial directions whose respective variance is largest being closest to the skew direction and therefore being the first approximation of the skew direction;

the act of using the first skew data to obtain the second skew data comprising:

for each of two or more nearby directions near the first approximation of the skew direction, obtaining variance data indicating a respective variance for the nearby direction, the respective variance indicating whether lines extending through the image in the nearby direction include some lines with many locations in characters and other lines with few locations in characters; and determining which one of the nearby directions has respective variance data that indicates a respective variance larger than the other nearby directions, the one of the nearby directions whose respective variance is largest being closest to the skew direction and therefore being the second approximation of the skew direction.

15. The method of claim 14 in which the initial directions are separated by a separating angle, the nearby directions ranging over a multiple of the separating angle from the first approximation of the skew direction.

16. A machine-implemented method of performing image processing on image data defining an image that includes lines of characters extending in a skew direction, the image data being received from an image input device or a digital image source; the method being performed by a machine that includes:

program memory storing instructions;

image data memory storing the image data; and a processor connected for executing instructions from the program memory and for accessing the image data in the image data memory;

the method being performed by operating the processor to execute instructions from the program memory;

the method comprising acts of:

accessing the image data in the image data memory;

using the image data accessed in the image data memory to obtain first skew data indicating a first approximation of the skew direction; and using the first skew data to obtain second skew data, the second skew data indicating a second approximation of the skew direction, the second approximation being more precise than the first approximation;

the act of using the image data to obtain first skew data comprising, for each of two or more directions, obtaining respective central value data indicating a central value of distances between characters in the direction.

17. A machine-implemented method of performing image processing on image data defining an image that includes two or more connected components, the connected components forming lines extending in a skew direction, the image data being received from an image input device or a digital image source; the method being performed by a machine that includes:

program memory storing instructions;

image data memory storing the image data; and a processor connected for executing instructions from the program memory and for accessing the image data in the image data memory;

the method being performed by operating the processor to execute instructions from the program memory;

the method comprising acts of:

accessing the image data in the image data memory;

using the image data accessed in the image data memory to obtain first skew data indicating a first approximation of the skew direction; and using the first skew data to obtain second skew data, the second skew data indicating a second approximation of the skew direction, the second approximation being more precise than the first approximation;

the act of using the image data to obtain first skew data comprising:

obtaining, for each of a set of locations at edges of connected components, measured distance data indicating distances measured in each of two or more directions to edges of connected components;

operating on the measured distance data to obtain central value data for each direction, each direction's central value data indicating a central value of distances measured in the direction; and using the central value data to obtain the first skew data by finding two directions that are separated by approximately 180° and at which minima of central value of distances occur.

18. A machine-implemented method of performing image processing on image data defining an image that includes lines of characters extending in a skew direction, the image data being received from an image input device or a digital image source; the method being performed by a machine that includes:

program memory storing instructions;

image data memory storing the image data; and a processor connected for executing instructions from the program memory and for accessing the image data in the image data memory;

the method being performed by operating the processor to execute instructions from the program memory;

the method comprising acts of:

accessing the image data in the image data memory;

using the image data accessed in the image data memory to obtain first skew data indicating a first approximation of the skew direction; and using the first skew data to obtain second skew data, the second skew data indicating a second approximation of the skew direction, the second approximation being more precise than the first approximation;

the act of using the first skew data to obtain second skew data comprising:

determining which one of two or more nearby directions is closest to the skew direction, each of the nearby directions being at or near the first approximation of the skew direction indicated by the first skew data; and obtaining the second skew data so that it indicates the one of the nearby directions that is closest to the skew direction;

the act of determining which one of two or more nearby directions is closest to the skew direction comprising:

for each of the nearby directions, obtaining variance data indicating a respective variance for the nearby direction, the respective variance indicating whether measurements beginning at two or more positions and extending through the image in the nearby direction include some measurements of many locations in characters and other measurements of few locations in characters; and determining which one of the nearby directions has respective variance data that indicates a respective variance larger than the other nearby directions, the one of the nearby directions whose respective variance is largest being closest to the skew direction.

19. A machine-implemented method of performing image processing on image data defining an image that includes lines of characters extending in a skew direction, the image data being received from an image input device or a digital image source; the method being performed by a machine that includes:

program memory storing instructions;

image data memory storing the image data; and a processor connected for executing instructions from the program memory and for accessing the image data in the image data memory;

the method being performed by operating the processor to execute instructions from the program memory;

the method comprising acts of:

accessing the image data in the image data memory;

using the image data accessed in the image data memory to obtain first skew data indicating a first approximation of the skew direction; and using the first skew data to obtain second skew data, the second skew data indicating a second approximation of the skew direction, the second approximation being more precise than the first approximation;

the act of using the image data to obtain first skew data comprising:

for each of two or more initial directions, obtaining variance data indicating a respective variance for the initial direction, the respective variance indicating whether lines extending through the image in the initial direction include some lines with many locations in characters and other lines with few locations in characters; and determining which one of the initial directions has respective variance data that indicates a respective variance larger than the other initial directions, the one of the initial directions whose respective variance is largest being closest to the skew direction and therefore being the first approximation of the skew direction;

the act of using the first skew data to obtain the second skew data comprising:

for each of two or more nearby directions near the first approximation of the skew direction, obtaining variance data indicating a respective variance for the nearby direction, the respective variance indicating whether lines extending through the image in the nearby direction include some lines with many locations in characters and other lines with few locations in characters; and determining which one of the nearby directions has respective variance data that indicates a respective variance larger than the other nearby directions, the one of the nearby directions whose respective variance is largest being closest to the skew direction and therefore being the second approximation of the skew direction.

* * * * *